United States Patent [19]

Eidler et al.

[11] Patent Number: 5,610,802
[45] Date of Patent: Mar. 11, 1997

[54] COMPACT ENERGY STORAGE SYSTEM

[75] Inventors: Phillip A. Eidler, Muskego; Michael R. Hughes, Port Washington, both of Wis.

[73] Assignee: ZB B Technologies, Inc., Wauwatosa, Wis.

[21] Appl. No.: 447,975

[22] Filed: May 23, 1995

[51] Int. Cl.$^6$ ....................................................... H02B 1/01
[52] U.S. Cl. ........................... 361/831; 361/829; 361/796; 174/50
[58] Field of Search ..................................... 361/752, 796, 361/831, 829; 211/182, 189; 248/27.1, 27.3; 312/234.4; 174/50, 58; 439/61, 325

[56] References Cited

U.S. PATENT DOCUMENTS

| | | | |
|---|---|---|---|
| 4,591,949 | 5/1986 | Lahr | 361/394 |
| 4,672,511 | 6/1987 | Meusel et al. | 361/415 |
| 4,796,159 | 1/1989 | Miksche | 361/429 |
| 4,894,764 | 1/1990 | Meyer | 363/65 |

Primary Examiner—Leo P. Picard
Assistant Examiner—Y. Whang
Attorney, Agent, or Firm—Godfrey & Kahn, S.C.

[57] ABSTRACT

An energy storage system including a housing adapted to rest on a supporting surface. The housing has a plurality of openings formed therein. Each of a predetermined number of the plurality of openings has a door mounted therein. The housing includes a sump, and located inside the housing are one or more racks. Each of the racks is adapted to hold a plurality of energy storing devices. The racks may include sliding shelves or energy storing device access mechanisms which permit each energy storing device to be moved from a first position to a second position. In addition, and optionally, the racks may be mounted on wheels so that they may be moved within the housing in order to provide access to the energy storing devices mounted thereon.

20 Claims, 28 Drawing Sheets

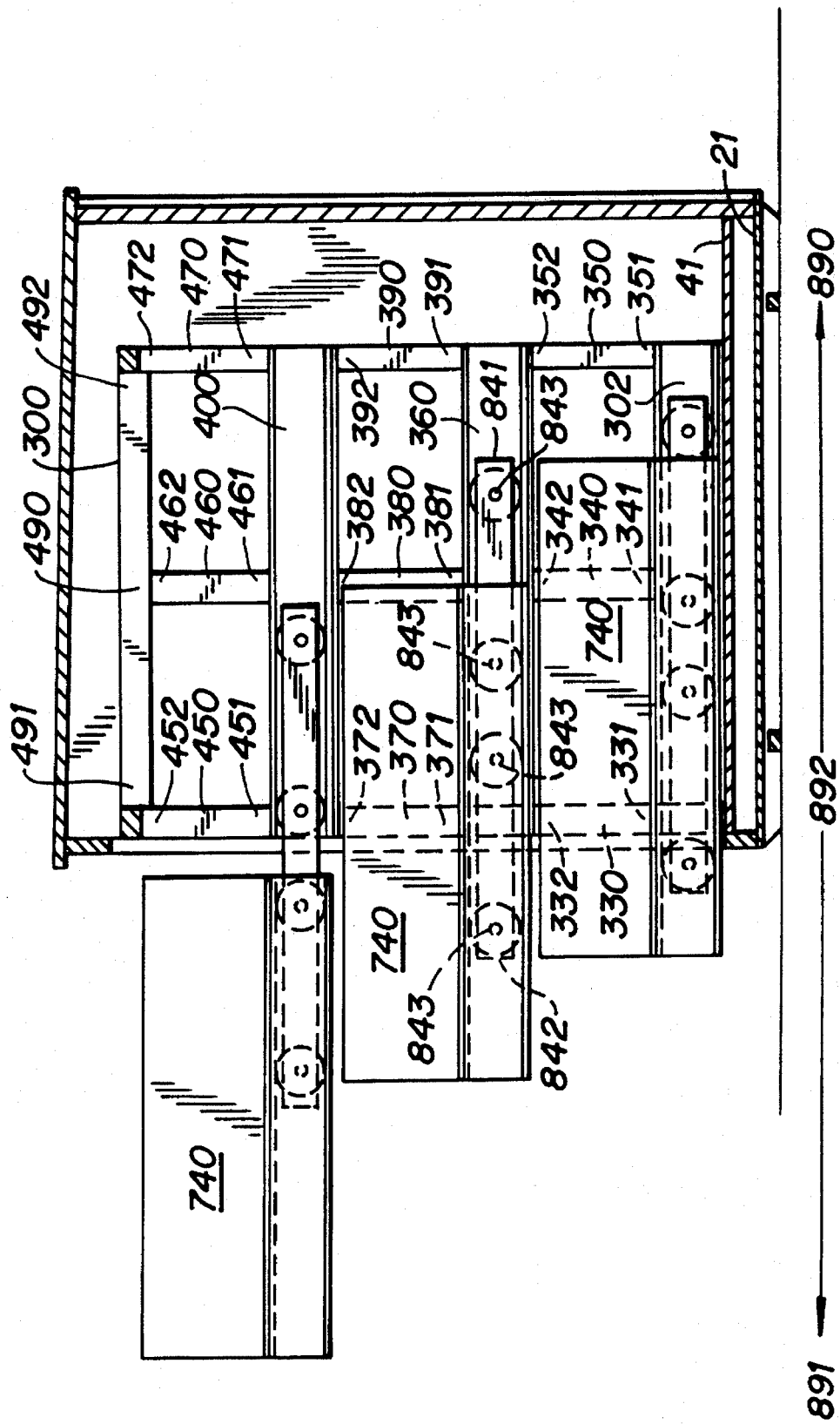

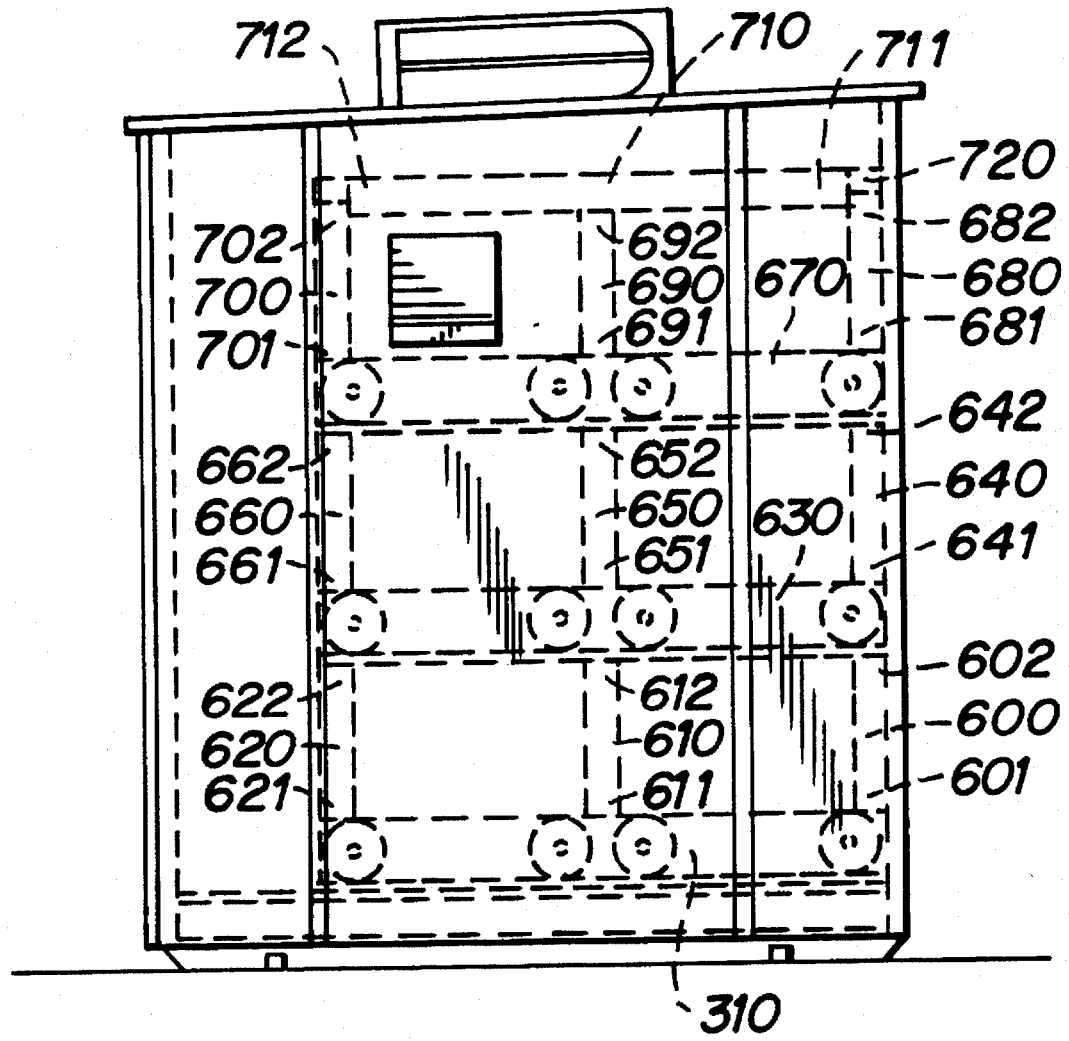
FIG_8

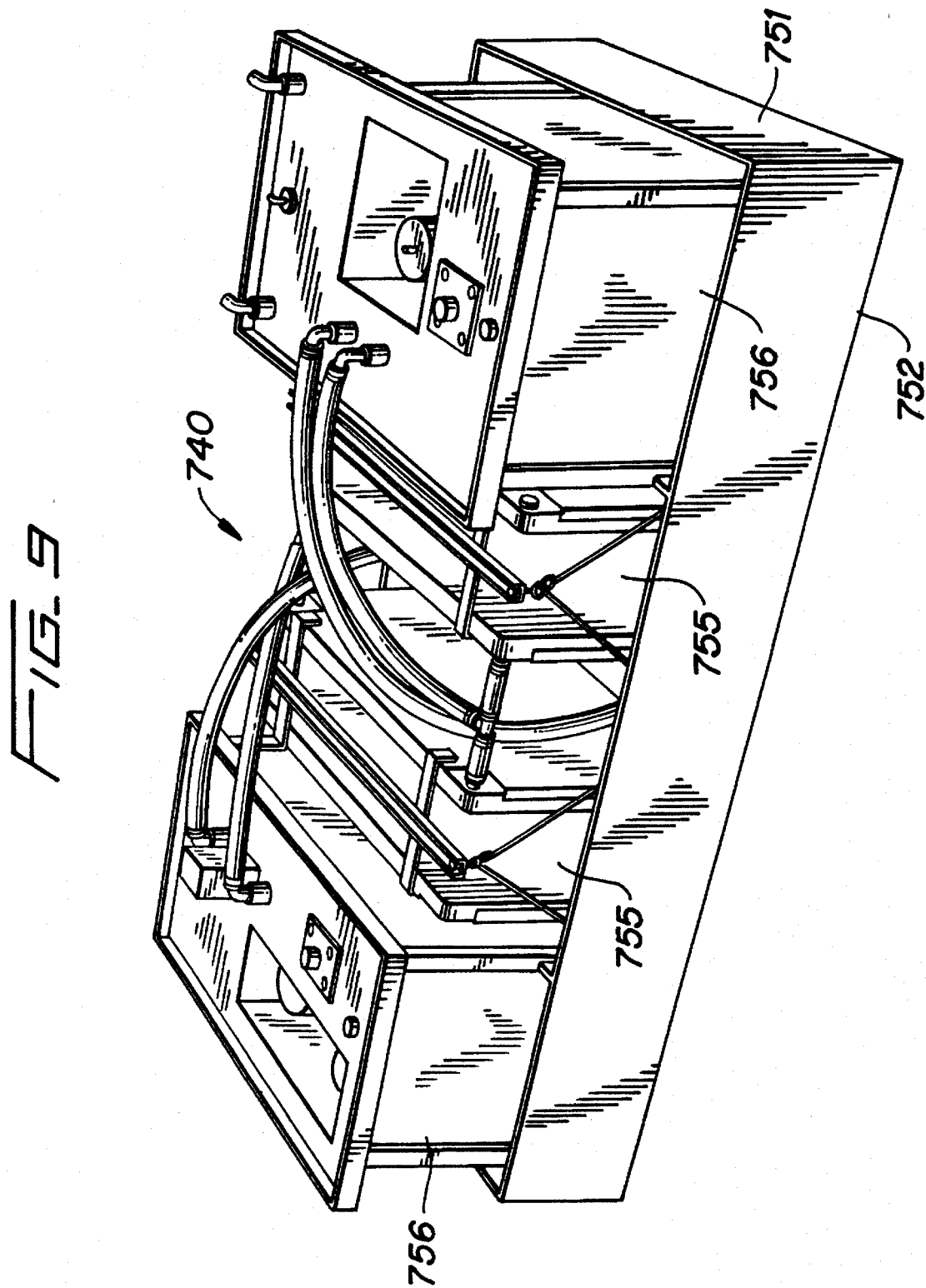

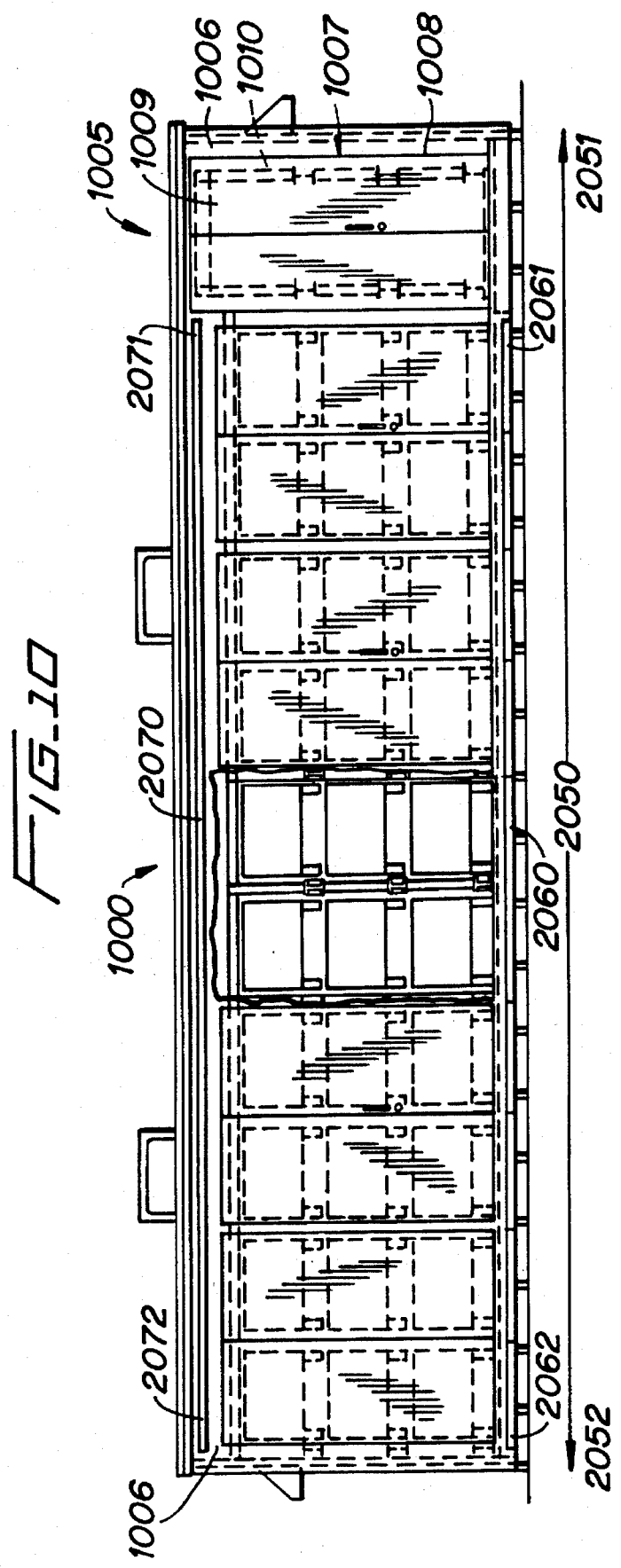

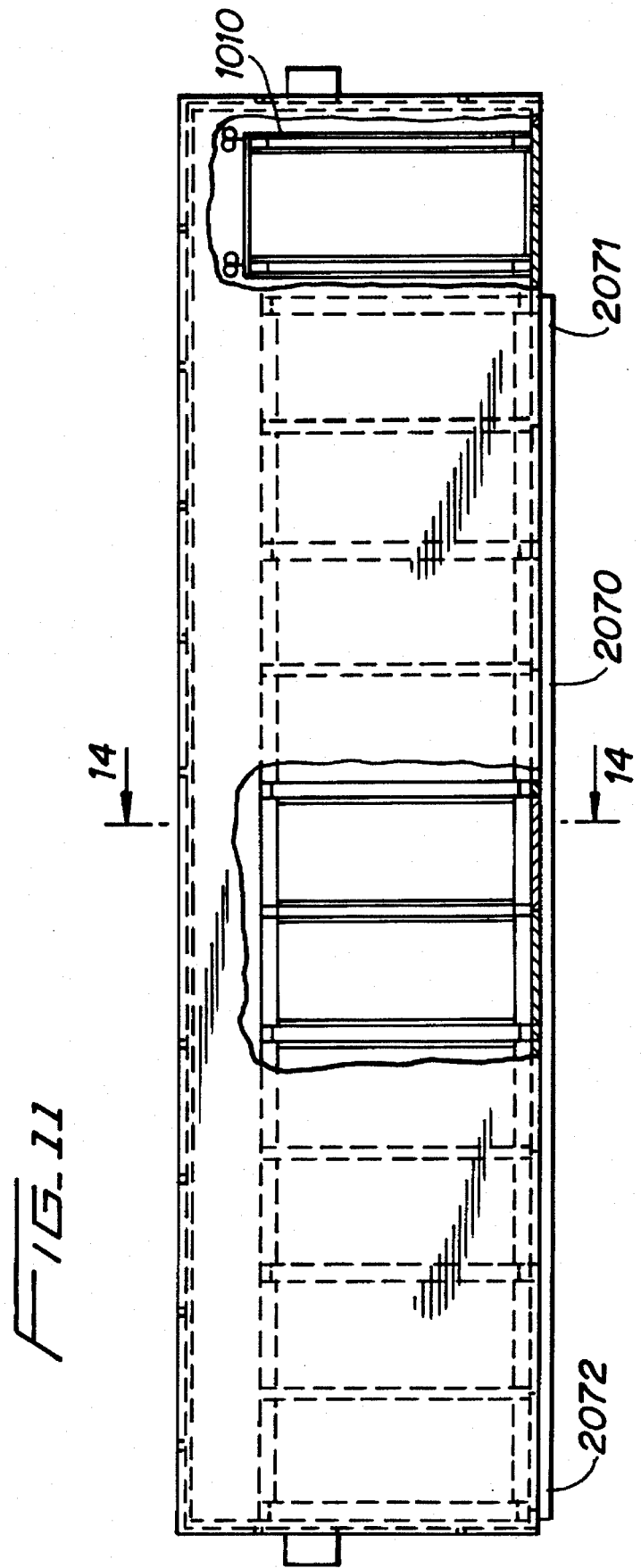

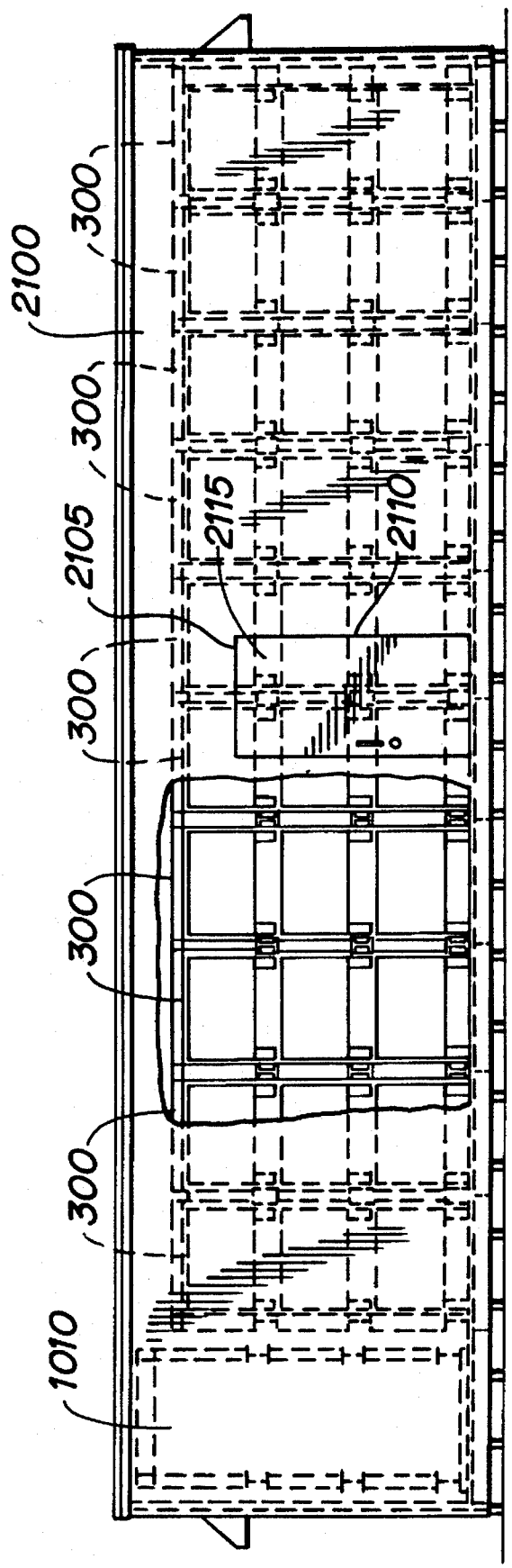

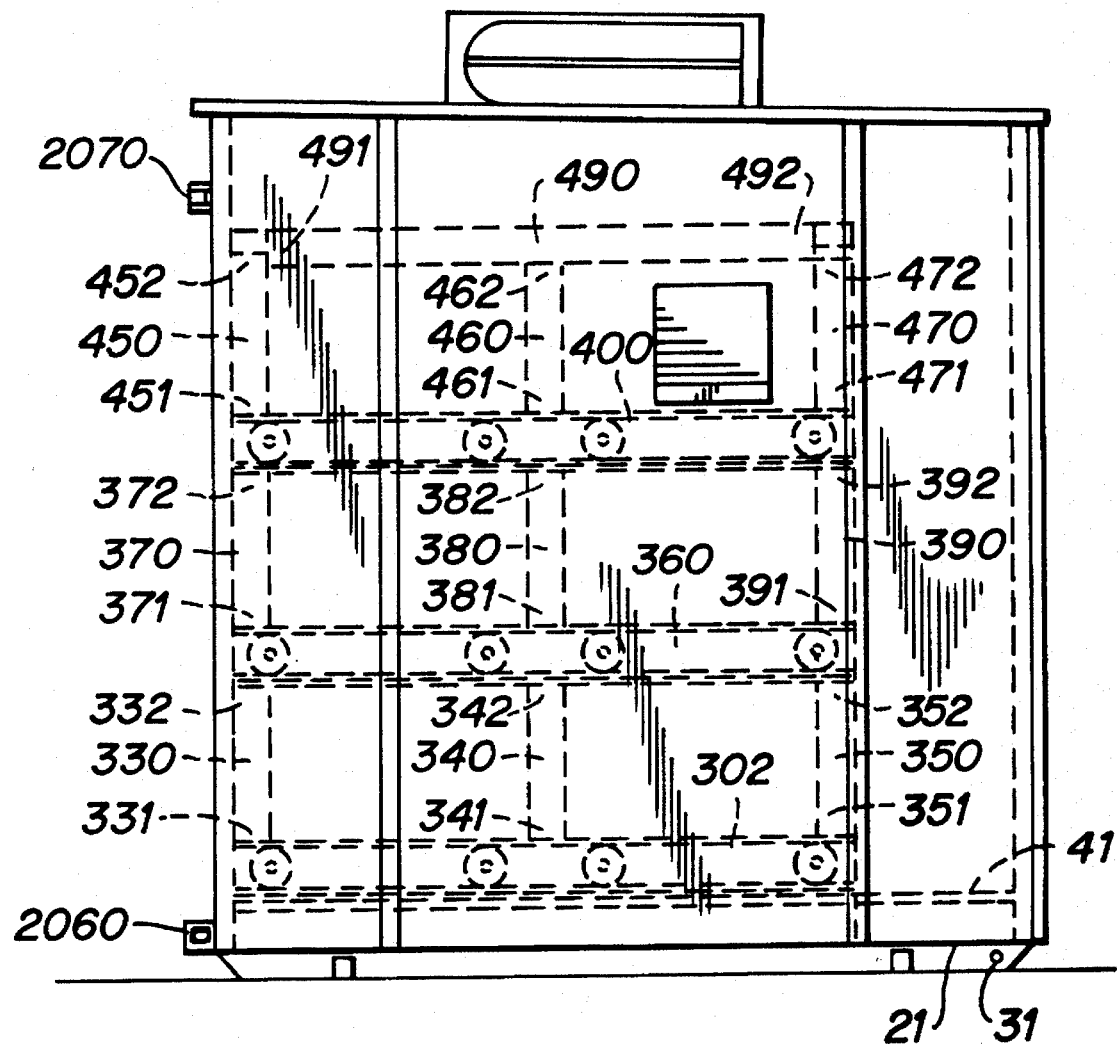
FIG_13

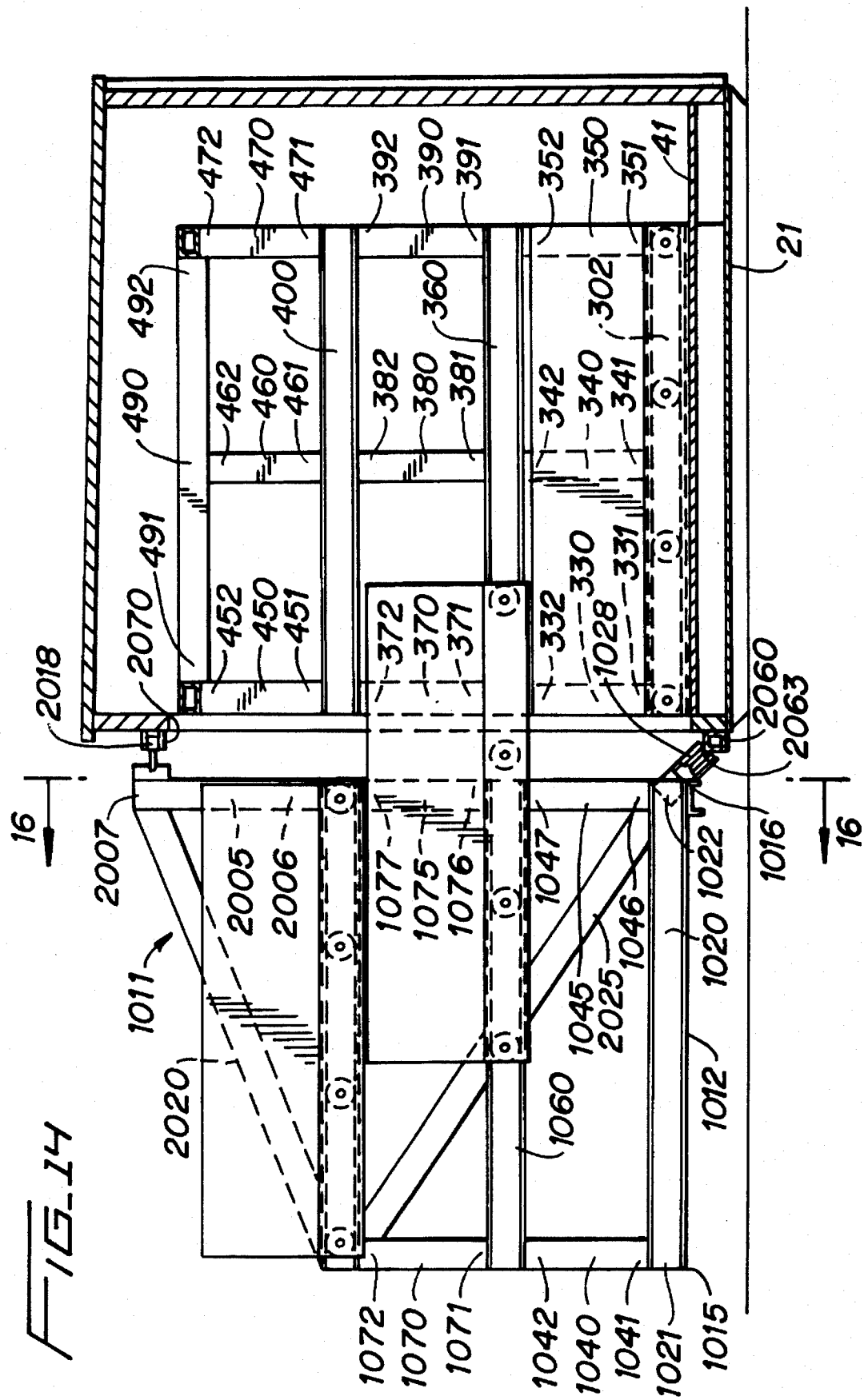

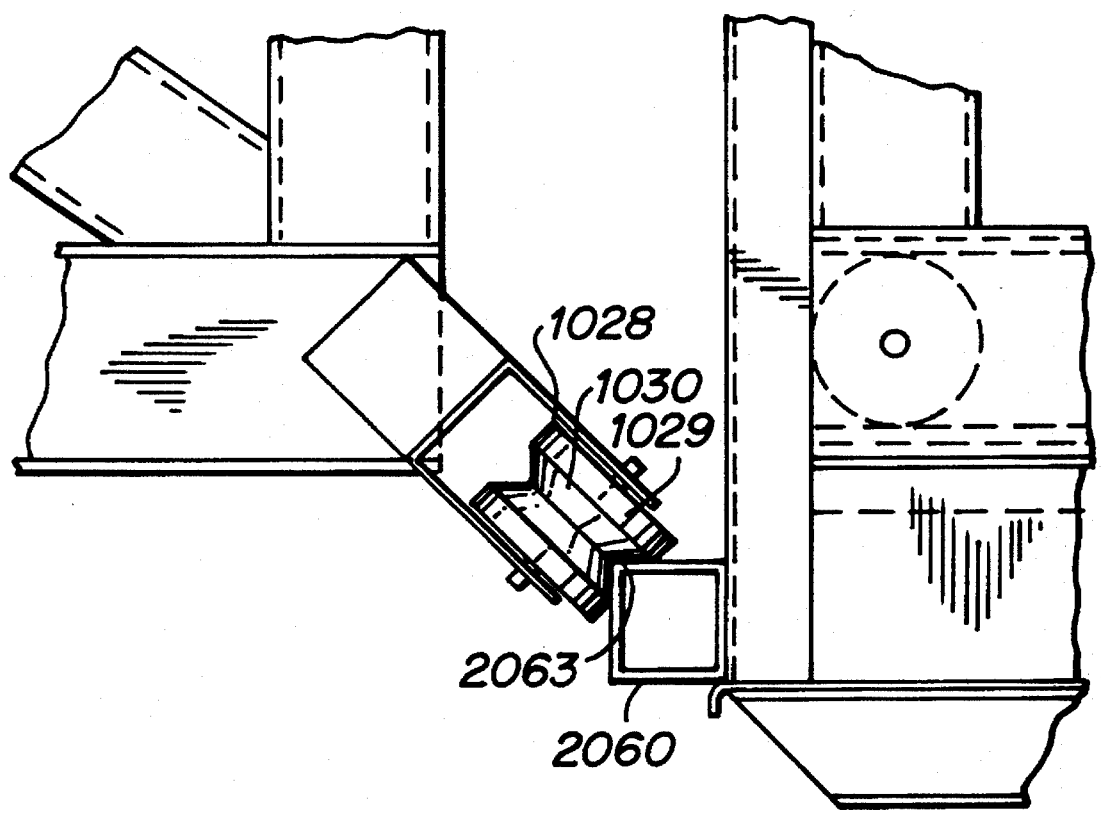
FIG_15

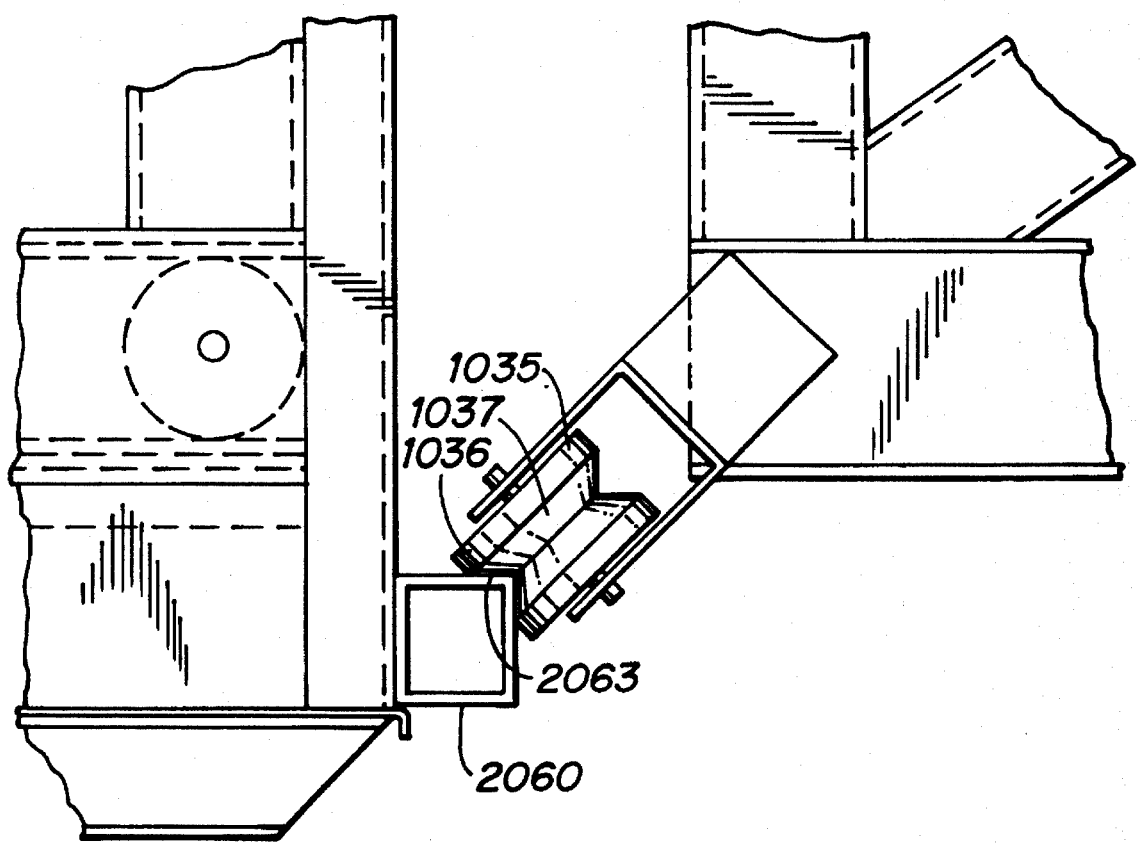
FIG_15A

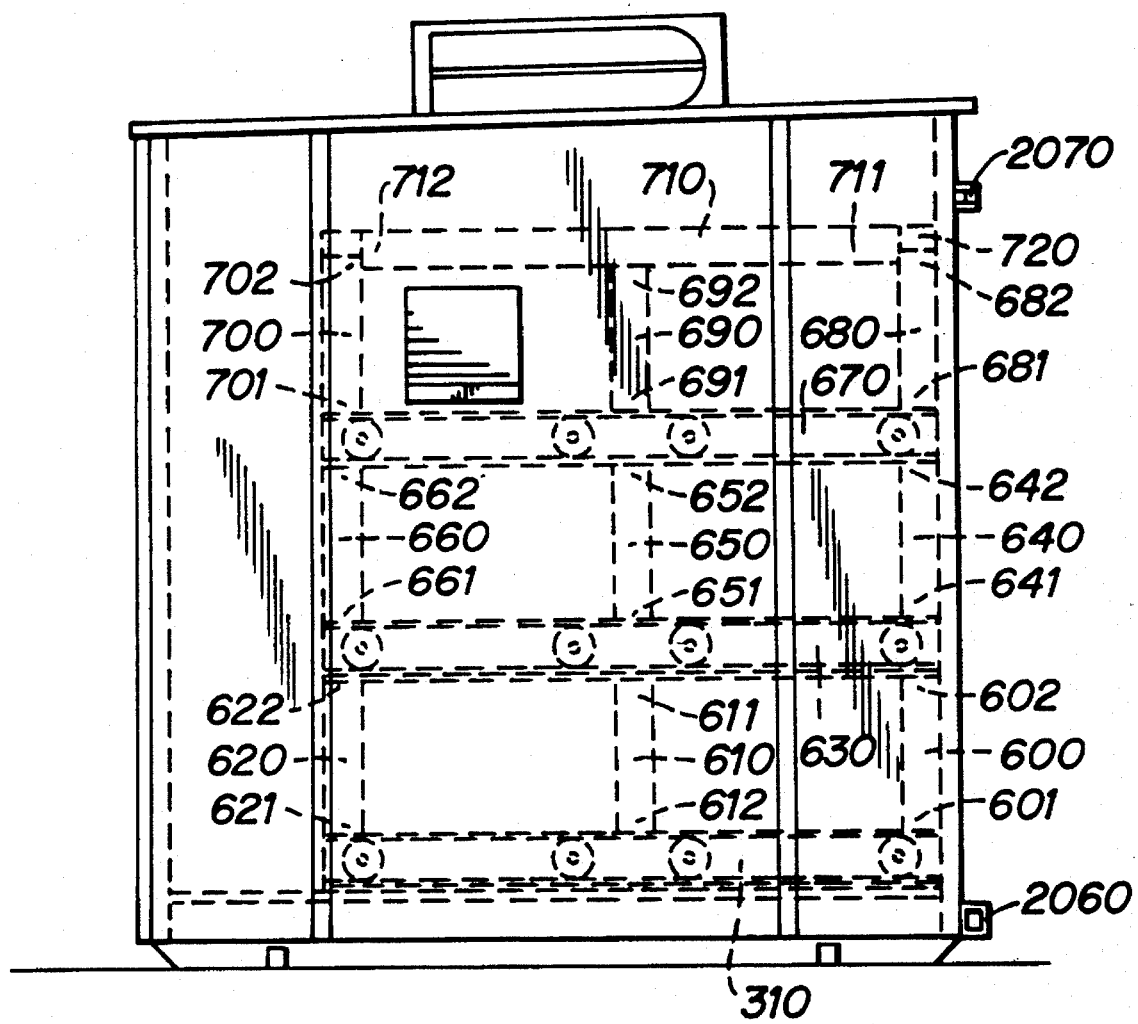
FIG_17

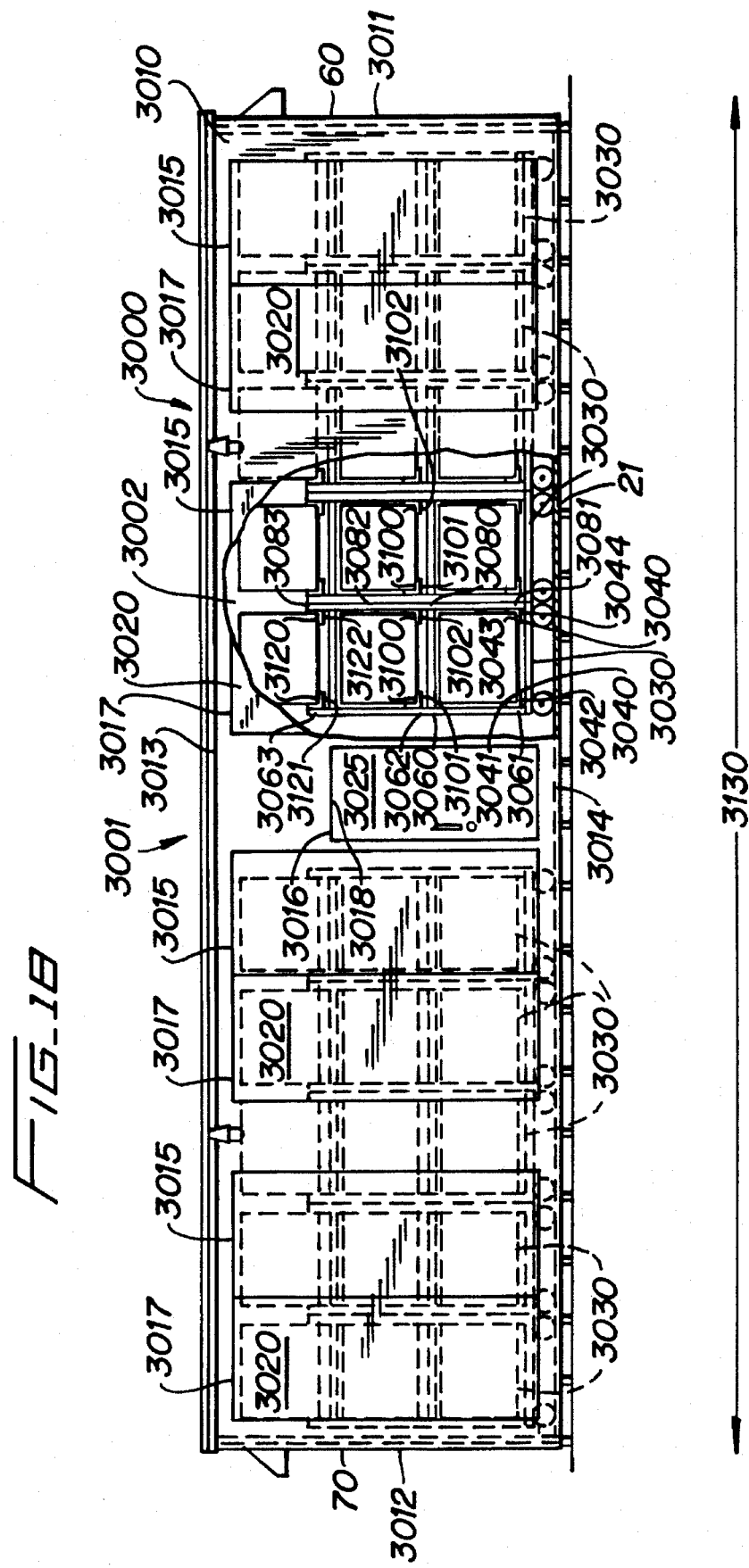

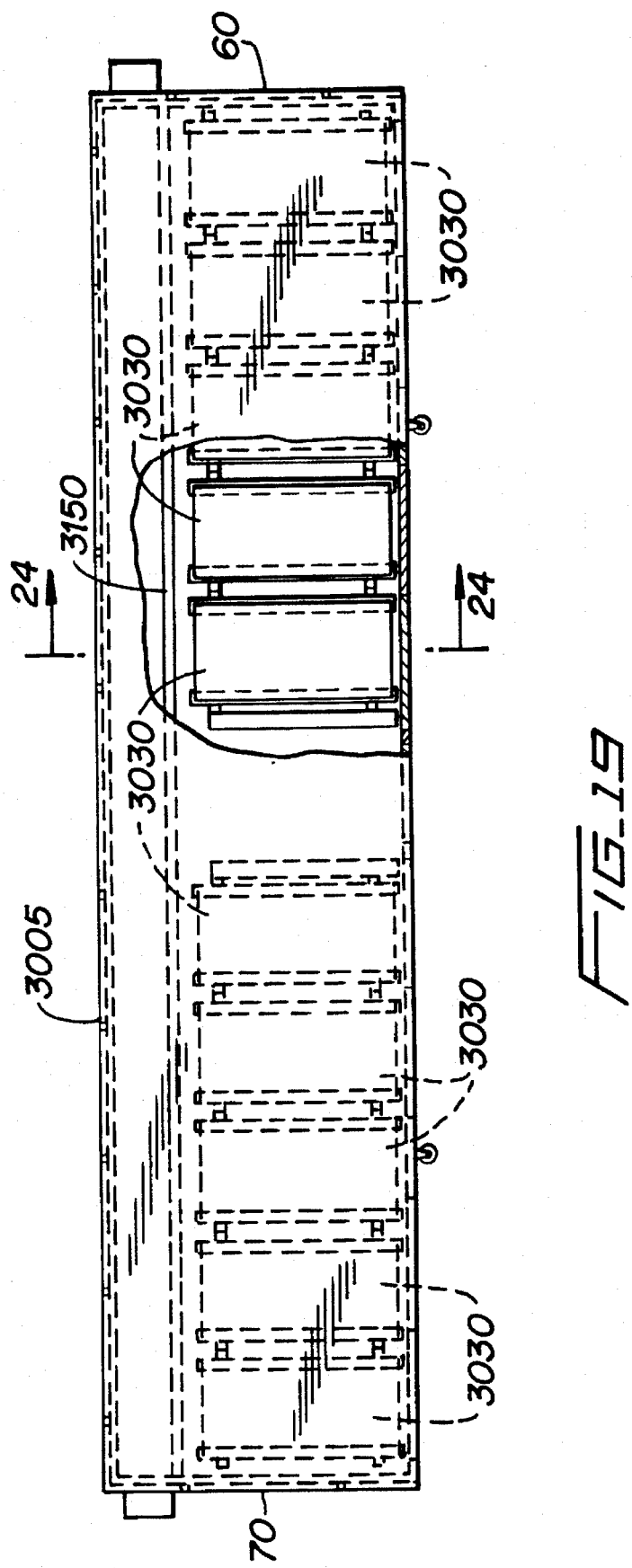

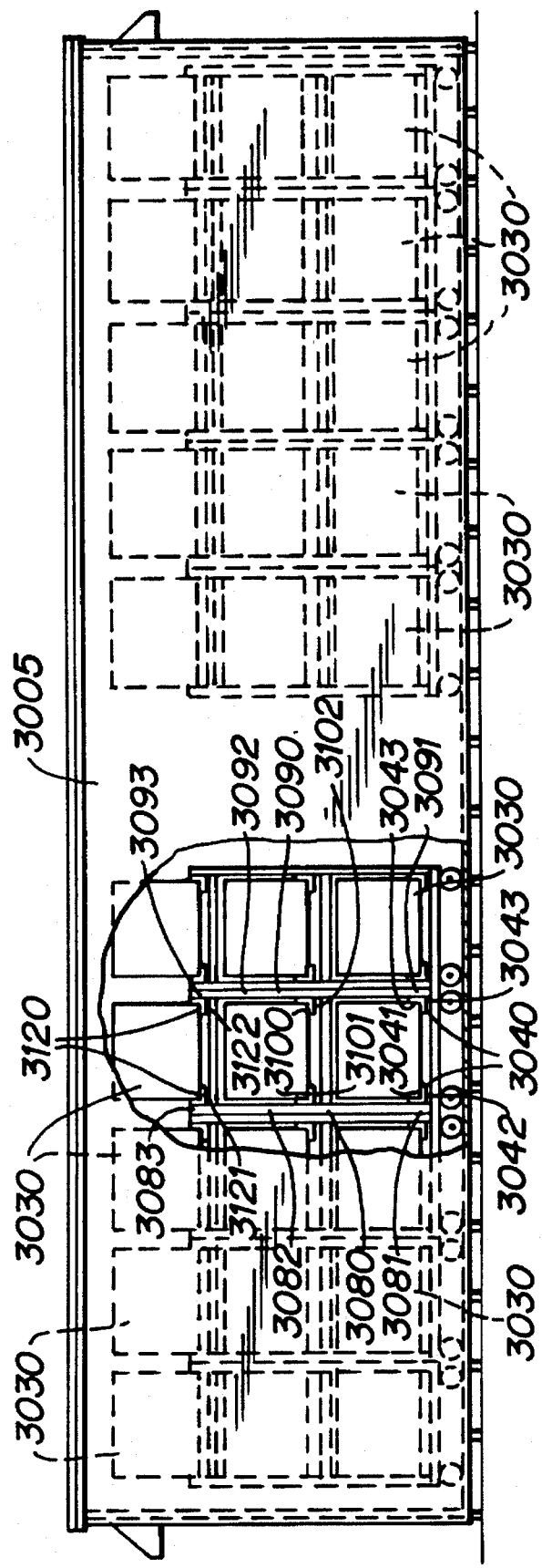

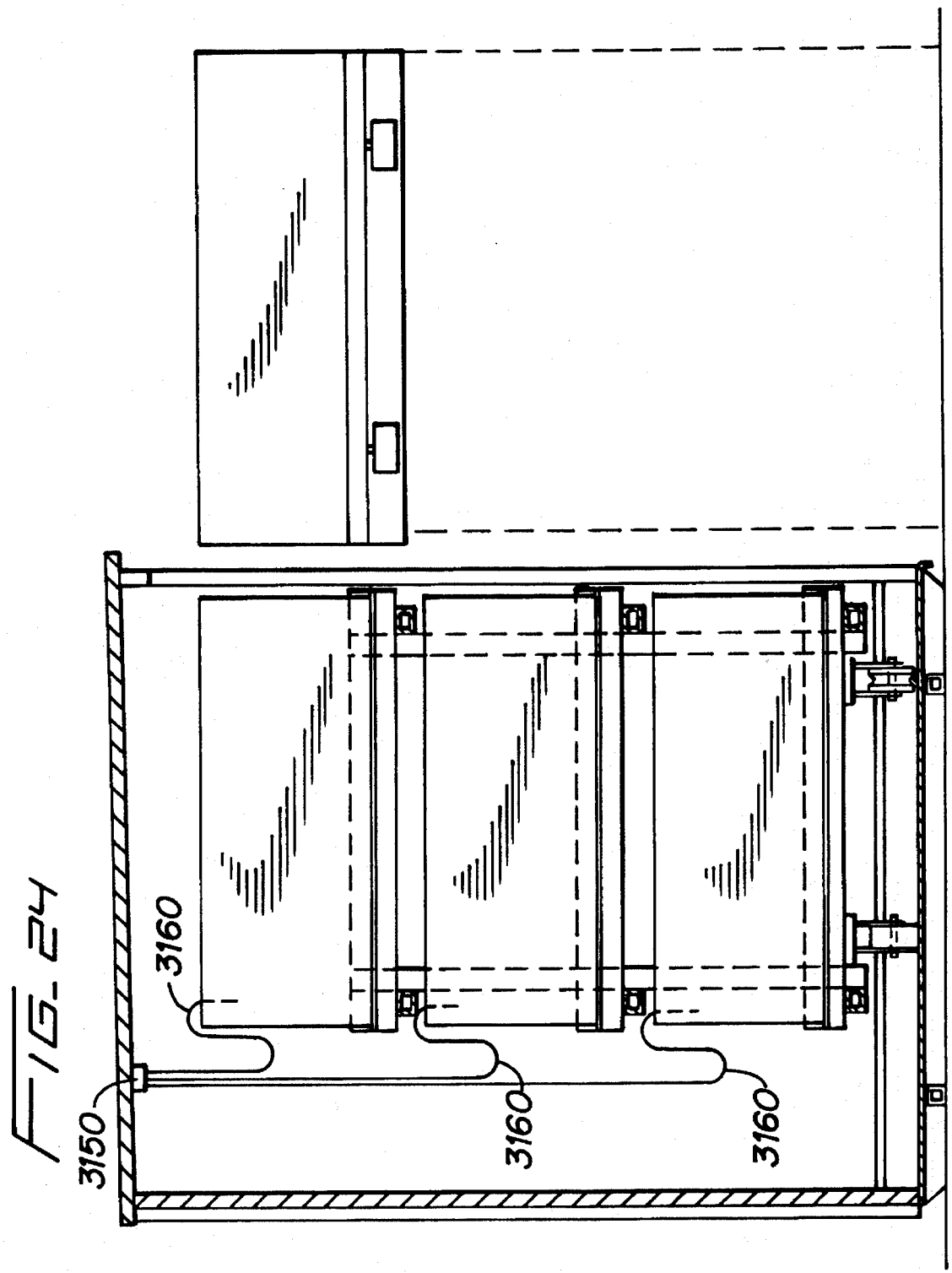

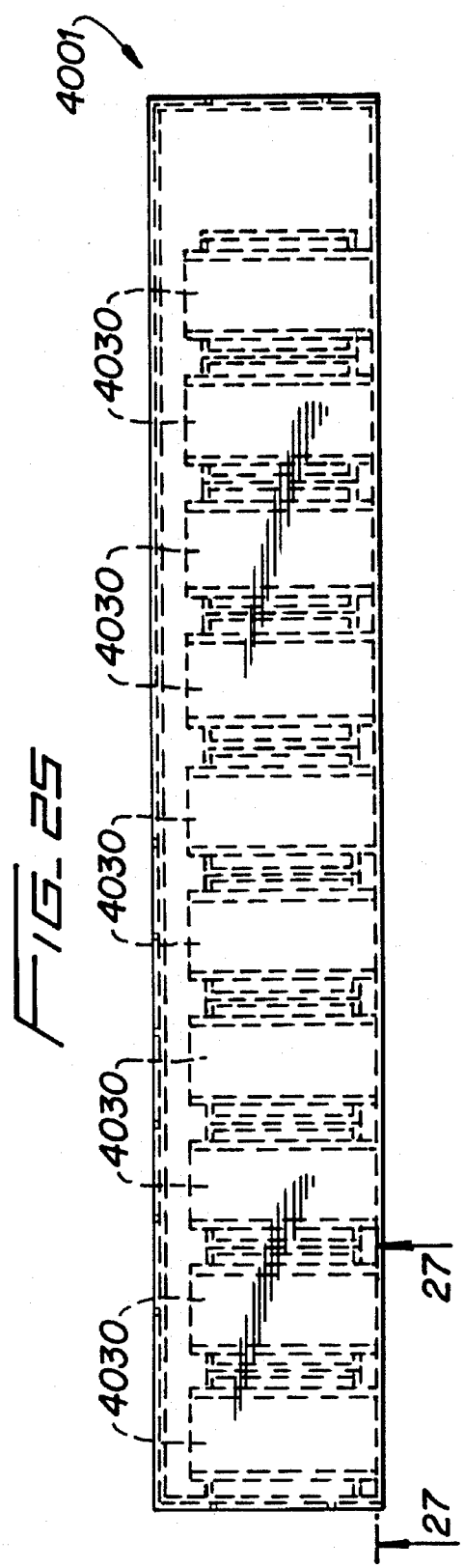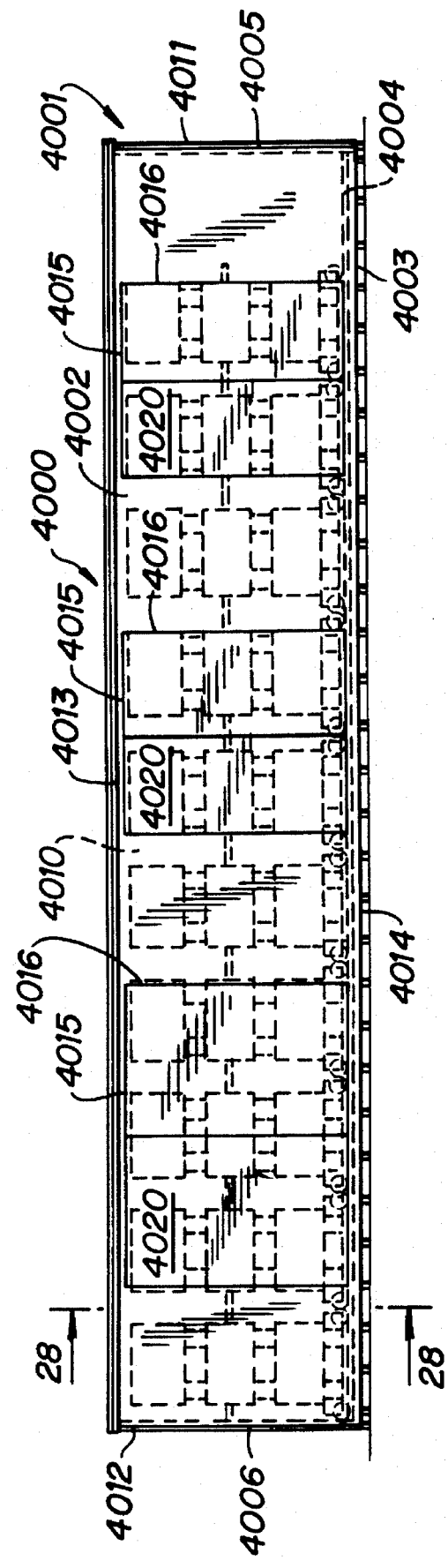

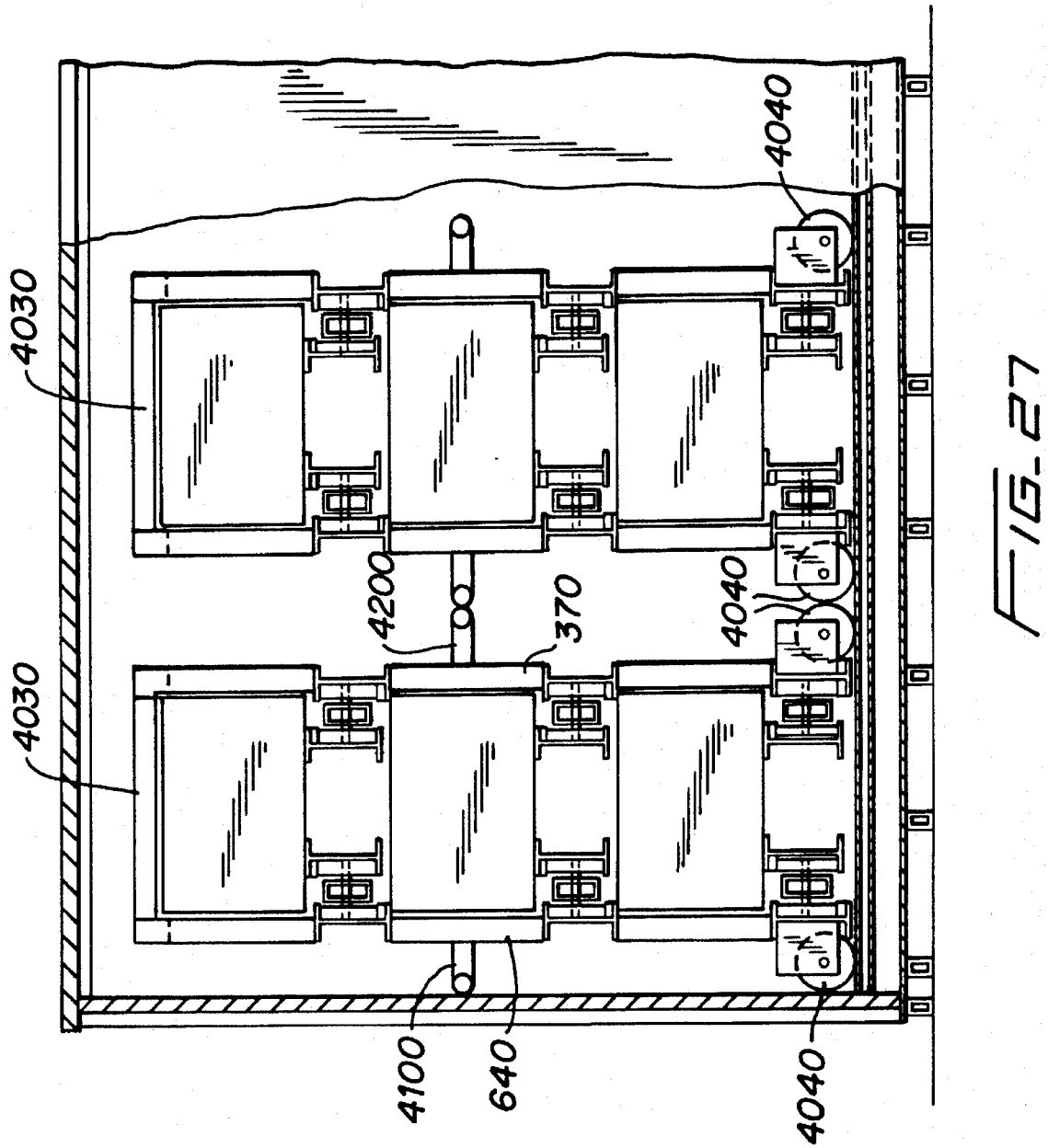

COMPACT ENERGY STORAGE SYSTEM

BACKGROUND OF THE INVENTION

1. Field of the Invention

The present invention relates to an energy storage system. More particularly, the present invention relates to a compact energy storage system which is capable of storing a plurality of energy storing devices.

2. Description of the Prior Art

It has long been thought that electric batteries might serve as the main component in energy or utility storage systems. However, most batteries either do not have adequate electric energy storage capacity to meet the demands of energy storage systems, or are very costly and, therefore, are inappropriate for such applications.

Energy storage applications involve the use of an energy storage system in order to supply electric power to an electric power transmission system during times of peak usage. It is well known that the demand for electric power fluctuates. Normally such fluctuations occur on a relatively regular basis. For example, in a typical residential electric power grid, demand for electric power is low at night, peaks during the morning, levels during the day, and peaks again in the late afternoon and into the evening.

Electric power utility companies use a variety of techniques to meet fluctuating demand while maintaining a relatively constant level of electric power production. For example, electric power utilities may use electric power to pump water into reservoirs during off-peak times, and then release the water from the reservoirs to hydro-electric generators during peak times to produce electrical power. However, there are circumstances where the demand for electric power suddenly and irregularly increases. One such instance is where cold weather strikes cities and communities that normally experience moderate temperature conditions. From the perspective of an electric power utility company, the associated increase in electric power demand occasioned by such weather occurrences is difficult to handle because the weather conditions and the increase in electric power demand are short lived. One way to handle short lived, irregularly occurring electric power demand increases is to electrically couple an electric energy storage system to an electric power transmission system so that the energy storage system may be utilized, or turned on, to provide additional electric power during peak demand. In particular, such a system would be useful if it was portable so that it could be placed at various locations in an electric power grid rather than at a generating source, such as a steam generator power plant. Such a storage system could feed electric power to that portion of the electric power grid experiencing a sudden, short lived increase in electric power demand such as might be occasioned by a period of cold weather. Thus, the storage system would supplement the power transmission system and prevent increased electrical power demand experienced by one portion of the electric power transmission grid from affecting other portions of the grid.

Although the benefits of a utility storage system have long been recognized, as noted above, prior-art batteries, and battery systems, have proven incapable of providing the high power output required for use in utility energy storage applications at a reasonable cost. Presently, batteries used in large storage systems are designed for use as auxiliary or standby power sources. Large battery installations are employed to provide electric power in emergency or power-failure circumstances, not to provide supplemental power to an electric power grid during demand peaks. Typically, large lead-acid batteries are used as standby power sources. For example, lead-acid battery systems providing 2000 ampere hours (Ah) are typically used to provide emergency lighting. Lead-acid battery systems providing 15,000 Ah are commonly used as standby power sources for telephone exchanges. Such battery systems, though relatively long lived, are extremely expensive and relatively large in size. In addition, such battery systems do not have the necessary electrical storage capacity per unit area to meet the demands of all electric energy storage applications.

Storage capacity per unit area is a significant factor for utility energy storage applications. High density storage batteries and energy systems are of higher value to electric utilities because they are, in general, more readily transported. The capacity of a battery is usually expressed in ampere hours, which is the product of current in amperes multiplied by the current flowing in the time of one hour. Battery capacity may also be expressed in terms of watt or kilowatt hours (kWh) which is the product of the power, or ampere-volts, multiplied by the time power is provided. However, a more informative measure of battery capacity is that of Ah or kWh per unit area. Presently, electric power utilities are seeking energy storage systems having storage capacities in excess of 100 kWh and as high as 5 to 10 MWh to supply supplemental power to a portion of an electric grid. However, at the same time, electric utilities require that such systems fit within an area of less than about 400 square feet and that such systems be relatively inexpensive.

Until recently such utility energy storage system have been impossible to achieve. However recent advances in battery technology have made it possible to produce batteries with a relatively high storage capacity per unit area at a relatively low cost.

In particular, advances in zinc-bromine battery technology have made it possible to create an energy storage system which has a high energy storage capacity and which is relatively lightweight and portable. In addition, zinc-bromine battery energy storage systems have significant cost advantages over other battery technologies. Of course, regardless of the battery or electric energy storing device technology used, an energy storage system must achieve maximize energy storage capacity in minimal space. Also, such systems must be easy to maintain. In addition, any portable system must be capable of sheltering the energy storing devices stored within it, while simultaneously preventing materials from the energy storing devices from contaminating the environment outside the storage system.

What is needed, therefore, is an energy storage system that has an energy storage capacity of greater than 100 kWh. Further, what is needed is a energy storage system that is relatively inexpensive, lightweight, and compact compared to previously known systems. Further what is needed is an energy storage system that is portable. Further, what is needed is an energy storage system that provides easy access to the batteries being used therein for purposes of replacement and maintenance. Further, what is needed is an energy storage system that provides shelter for energy storage devices. Further, what is needed is an energy storage system that is capable of containing materials within the system which if leaked or otherwise disbursed would cause damage to the environment outside the energy storage system. Lastly, what is needed is an energy storage system that may employ various electric energy storing devices including batteries.

OBJECTS AND SUMMARY OF THE INVENTION

Therefore, it is an object of the present invention to provide an energy storage system.

A further object of the present invention is to provide an energy storage system that has an energy storage capacity of greater than 100 kWh.

A further object of the present invention is to provide an energy storage system that is portable.

A further object of the present invention is to provide an energy storage system that fits within an area of less than about 400 square feet.

A further object of the present invention is to provide an energy storage system that is relatively lightweight, inexpensive and compact compared to previously known systems.

A further object of the present invention is to provide an energy storage system wherein a plurality of energy storing devices, such as batteries may be stored.

A further object of the present invention is to provide an energy storage system that provides shelter for energy storing devices from environmental agents, such as water, wind, dust, and light.

A further object of the present invention is to provide an energy storage system that prevents the leakage or spillage of materials within the system which if leaked or otherwise disbursed would cause damage to the environment outside the energy storage system.

A further object of the present invention is to provide an energy storage system that provides ready access to the energy storing devices contained within it.

These and other objects and advantages are achieved in a device of the present invention which includes a housing, having a plurality of openings which are closed by a plurality of access doors. The access doors are adapted to matingly fit within the openings and are mounted thereon. The housing is constructed so as to prevent water, dust, wind, and other environmental agents from entering it. Located within the housing is a least one rack upon which a plurality of electric energy storing devices, such as batteries, may be mounted. The electric energy storing devices may be slidably mounted on the rack. The rack is constructed and positioned such that access to the electric energy storing devices mounted on it may be obtained through the openings in the housing by opening the access doors.

In one form of the present invention, the rack includes a plurality of sliding shelves or sliding shelf mechanisms. An energy storing device may be mounted upon each sliding shelf or sliding shelf mechanism so that the energy storing device may be moved from a first, or operational position, to a second, or maintenance position.

In another form of the present invention, an energy-storing-device carrier may be slidably mounted on the housing. The carrier is mounted on one or more rails which are mounted or otherwise formed on the front wall of the housing. The carrier can be moved from a first position, at the first end of the front wall, to a second position, at the second end of the front wall, to any convenient location, such as in front of an open access door. Energy storing devices, such as batteries, may be slidably installed, removed, or serviced on or from the carrier. In addition, the carrier facilitates the installation and removal of energy storing devices to and from the racks mounted within the housing.

In another form of the present invention, a plurality of racks are located within the housing and each one of them is mounted on wheels so as to permit the racks to roll on the floor of the housing. The wheels may be interfitted with a track mounted or formed on the floor of the housing so as to guide the movement of the racks therein. The racks may be positioned along a line of movement so that a space is created between adjacent racks in order to provide access to the energy storing devices mounted on the racks. The space provides a location from which service personnel may install, remove, or perform necessary maintenance on the energy storing devices.

In other forms of the present invention, the features previously described, such as wheel-mounted racks, sliding shelves, and battery storing device carriers may be combined in order to further facilitate the maintenance, installation, and removal of energy storing devices in the system.

BRIEF DESCRIPTION OF THE DRAWINGS

FIG. 7 is a right side, cross-sectional view of the first form of the present invention taken along the line 7—7 of FIG. 2 and showing energy storage devices in various positions and mounted on sliding shelves.

FIG. 8 is a left side elevation of the first form of the present invention.

FIG. 9 is a right side, perspective, environmental view of an exemplary energy storing device which may be used in the storage system of the present invention.

FIG. 10 is a front elevation view of a second form of the present invention.

FIG. 11 is a top plan view of the second form of the present invention.

FIG. 12 is a rear elevation view of the second form of the present invention.

FIG. 13 is a right side elevation view of the second form of the present invention.

FIG. 14 is a right side, cross-sectional view of the second form of the present invention taken along line 14—14 of FIG. 11 and showing an energy-storing-device carrier mounted on the housing of the present invention.

FIG. 15 is an enlarged, fragmentary, right side view of a portion of the second form of the present invention showing a guide rail upon which the energy-storing-device carrier travels.

FIG. 15A is an enlarged, fragmentary, left side view of a portion of the second form of the present invention showing a guide rail upon which the energy-storing-device carrier travels.

FIG. 17 is a left side elevation view of the second form of the present invention.

FIG. 18 is a front elevation view of a third form of the present invention.

FIG. 19 is a top plan view of the third form of the present invention.

FIG. 21 is a rear elevation view of the third form of the present invention.

FIG. 24 is a left side, cross-sectional view of the third form present invention taken along the line 24—24 of FIG. 19 and illustrating energy storing device installation and removal.

FIG. 25 is a front elevation view of a fourth form of the present invention.

FIG. 26 is a top, plan view of the fourth form of the present invention.

FIG. 27 is a cross-sectional view of the fourth form of the present invention taken along the line 27—27 of FIG. 26.

DETAILED DESCRIPTION

First Form

Figure 1:
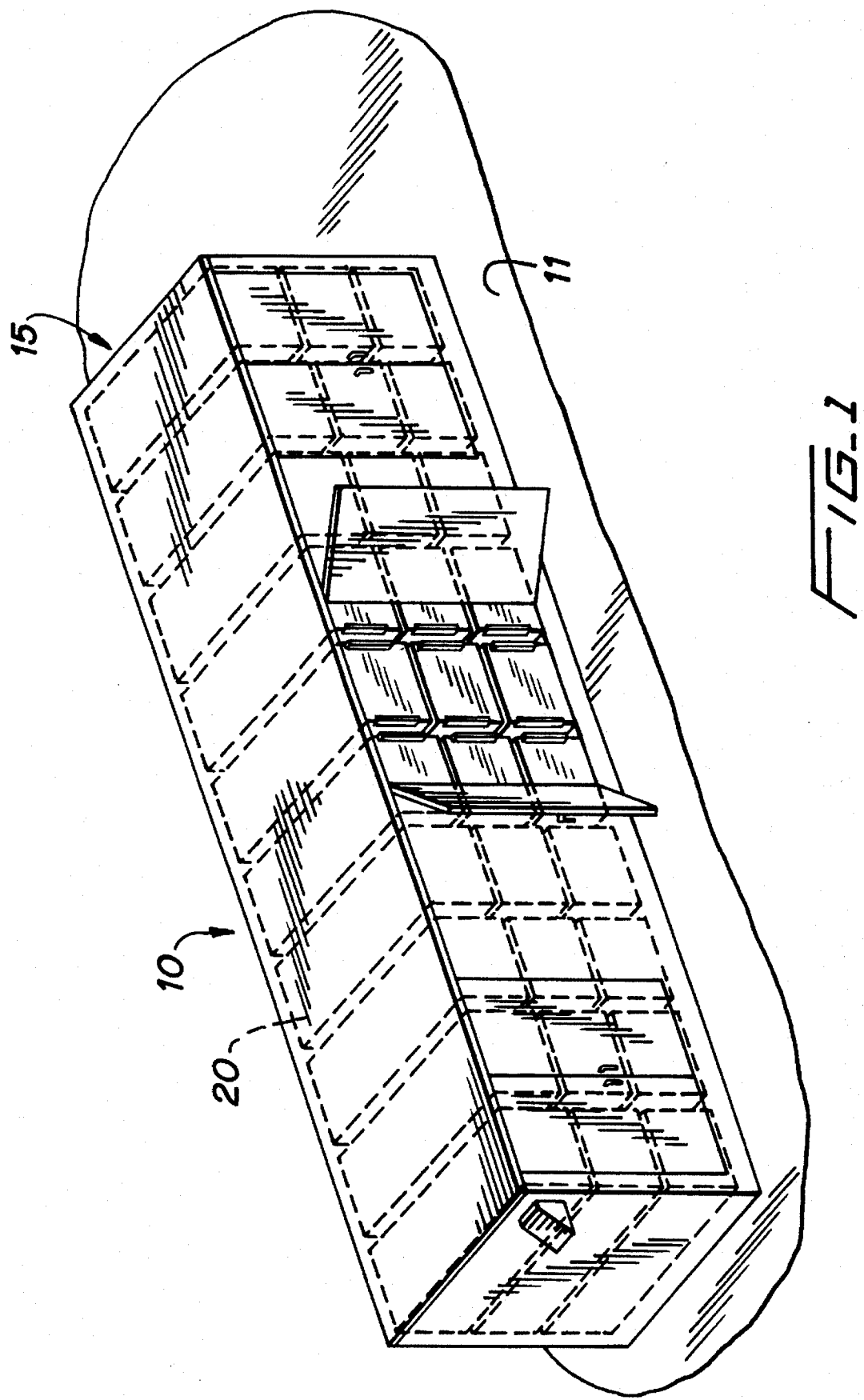
FIG. 1 is a left perspective, environmental view of a general form of the system of the present invention.

Referring more particularly to the drawings, an energy storage system manufactured in accordance with the teachings of the present invention is designated generally by the numeral 10 in FIG. 1. The energy storage system 10 is adapted to rest on a supporting surface 11, such as a concrete slab positioned on the surface of the earth, or an equivalent flat surface such as might be obtained by preparing an area of ground by asphalt, stone, or gravel paving.

As can be seen by reference to FIGS. 1 through 8, the energy storage system 10 includes a housing 15. The housing 15 has an interior 20 and includes a first floor 21 having a first end 22, a second end 23, a front side 24 and a rear side 25. Preferably, the floor 21 is approximately 37 feet in length and approximately 10 feet in width. Mounted on the first floor 21 is a plurality of spacers 26 which contact the supporting surface 11 and a pair of forklift pockets 27. The spacers 26 maintain the first floor in spaced relation relative to the supporting surface 11. Mounted on the spacers 26 may be a plurality of hold-down angle brackets 30. In addition, an exterior grounding lug or lugs 31 (FIG. 6) may be mounted on one or more of the spacers 26.

Positioned in substantially parallel spaced relation to the first floor 21 is a second floor 41. The second floor 41 has a first end 42, an opposite or second end 43, a front side 44, and a rear side 45. Positioned between the first floor 21 and the second floor 41 is a plurality of floor spacers 46 which act as dividers for a sump, discussed later herein. The floor spacers 46 maintain the second floor 41 in an elevated position relative to the first floor 21.

Mounted on the first floor 21 at the first end 22 is a first side wall 60. The side wall 60 has a bottom end 61, a top end 62, a front edge 63, and a rear edge 64. An exhaust outlet 65, which may be coupled to an exhaust system (not shown), may be mounted within an opening (not shown) in the side wall 60. The first side wall 60 may also include an opening (not shown) through which an electrical conduit may pass. The conduit provides an electrical couple between the energy storing devices within the housing and an electric power transmission system.

Similarly, a second side wall 70 is mounted on the first floor 21 at the second end 23. The second side wall 70 has a bottom end 71, a top end 72, a front edge 73, and a rear edge 74. As with the first side wall 60, an exhaust outlet 75, which may be coupled to the exhaust system, may be mounted within an opening (not shown) of the second side wall 70. In addition, the second side wall may include an opening (not shown) through which an electrical conduit may pass.

Positioned between the first side wall 60 and the second side wall 70 is a front wall 80. The front wall 80 has a first end 81, a second end 82, a top edge 83, and a bottom edge 84. The front wall 80 has a plurality of openings 85. In the preferred form, the front wall 80 has five openings.

Each of the openings 85 has a peripheral edge 90 around which may be mounted sealing material (not shown). Polymeric sealing material as well as other materials such as fiberglass may be used. Each of the openings 85 may be occluded by a plurality of access doors 100. In the preferred form, each of the access doors 100 is a double door which may be opened in order to permit access to the interior of the housing 20. Each double access door 100 provides an air tight seal around each of the peripheral edges 90 of the openings 85. Preferably, each double access door is approximately 10 feet tall and approximately 6½ feet wide.

As with the front wall 80, a rear wall 180 is positioned between the first side wall 60 and the second side wall 70. The rear wall 180 is opposite the front wall 80. The rear wall 180 has a first end 181, a second end 182, a top edge 183, and a bottom edge 184. The rear wall 180 has a opening 185 which may be centrally positioned in the rear wall. The opening 185 has a peripheral edge 190 and is adapted to receive and be occluded by an access door 200. In the preferred form, the access door 200 is a single door which may be opened in order to permit access to the interior of the housing 20. The access door 200 provides an air tight seal around the opening 185. As with the openings 85 of the front wall 80 a sealing material may be mounted around the peripheral edge 190.

Figure 3:
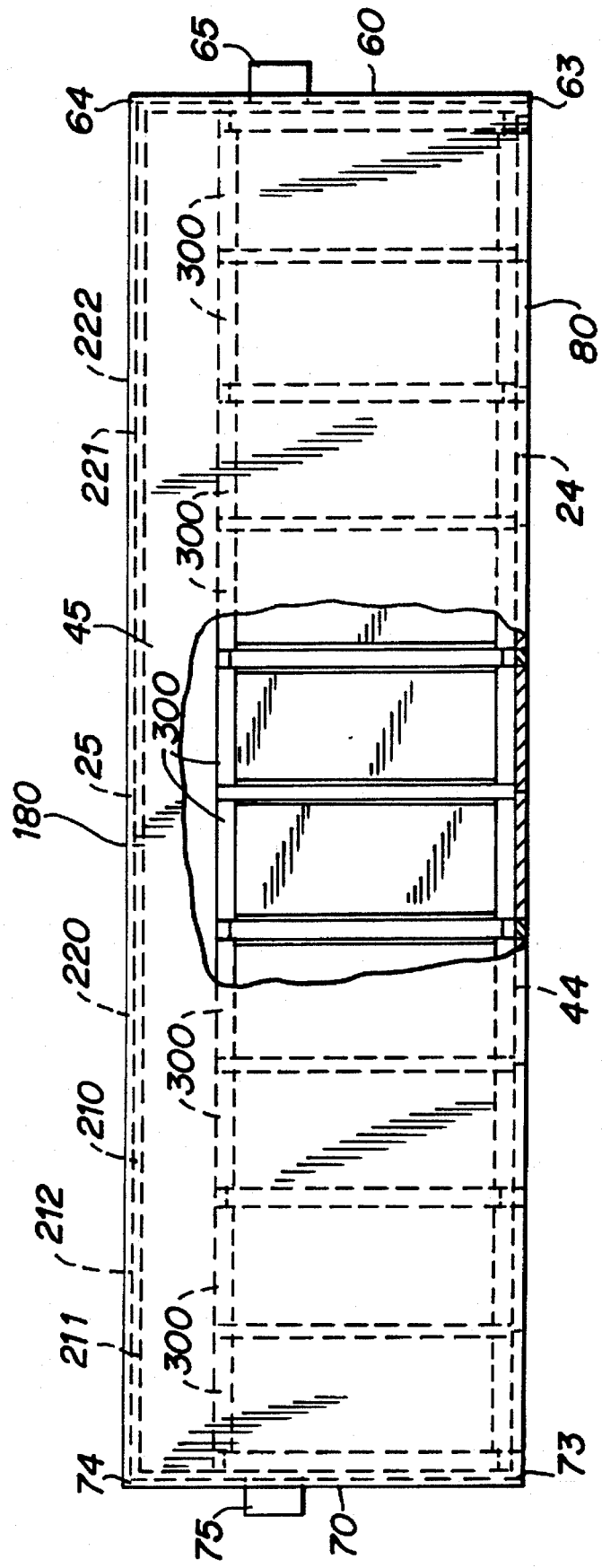
FIG. 3 is a top, plan view of the first form of the present invention.

As can be seen by reference to FIGS. 1 and 3, the first side wall 60, the second side wall 70, the front wall 80, and the rear wall 180 are integral with one another. In addition, each wall is mounted on the first floor 21 and the bottom end 61, bottom end 71, bottom edge 84, and bottom edge 184 (FIG. 4), together with the floor 21 define a sump 190. In order to enhance sump 190's resistance to corrosive materials, the sump 190 is lined with a sump liner (not shown) which is preferably a ⅛ inch thick sheet of polyethylene.

Though, the present system is designed with a sump, a sump may not be needed for all applications. In particular, when energy storing devices which do not contain a liquid electrolyte are used, a sump may not be needed.

Preferably, each wall of the housing is of double-layer construction and includes an innerskin 210 and outerskin 220. The innerskin 210 may be made from 12 gauge ASTM A569 steel and the outerskin may be made of 10 gauge ASTM A569 steel. The innerskin has an interior facing surface 211 and exterior facing surface 212. Similarly, the outerskin has an interior facing surface 221 and an exterior facing surface 222. It should be understood that the walls of the energy storage system may be of single-layer construction.

In one form, when the battery storing devices, discussed later hereinafter, are zinc-bromine batteries, the interior facing surface 211 and the exterior facing surface 222 are each covered with a protective coating of polyamide epoxy resin which is resistant to bromine. In addition, the exterior surface 222 may have a coat of polyurethane paint on top of the polyamide epoxy resin. Various other protective coatings may be applied to the walls of the system when other types of energy storing devices are used within it.

Figure 2:
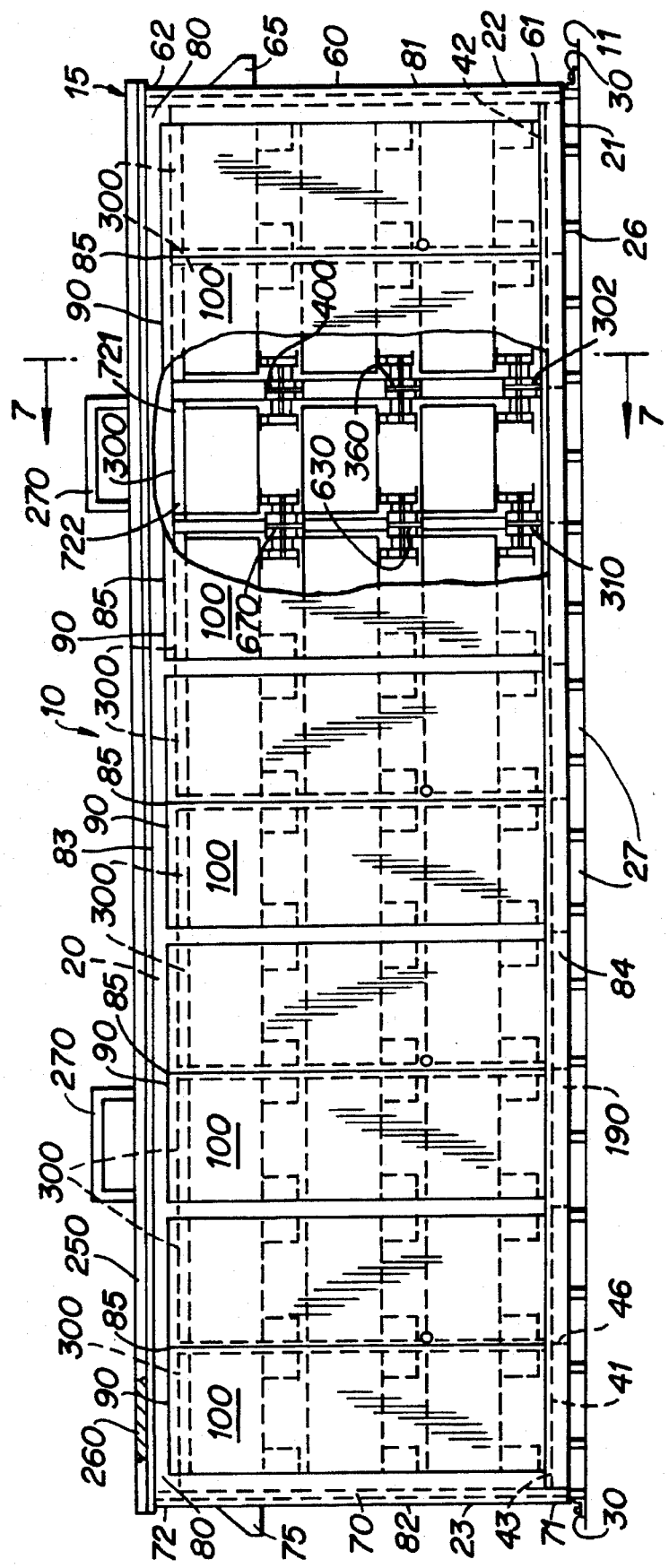
FIG. 2 is a front elevation view of a first form of the present invention.

Mounted on top of the first side wall 60, the second side wall 70, the front wall 80, and the rear wall 180 is a roof 250 (FIG. 2). As should be understood, the front wall 80 is taller than the rear wall 180 so that the roof 250 slopes downwardly from the front wall 80 to the rear wall 180. However, the housing may be constructed so that the roof is flat. The roof 250 is made from 12 gauge ASTM A569 steel and at its highest point, excluding any exhaust, heating, or cooling units mounted thereon, is approximately 12 feet from the surface 11. As should be understood, the roof 250, and walls 60, 70, and 180 may be filled with insulation 260 of conventional types.

Figure 6:
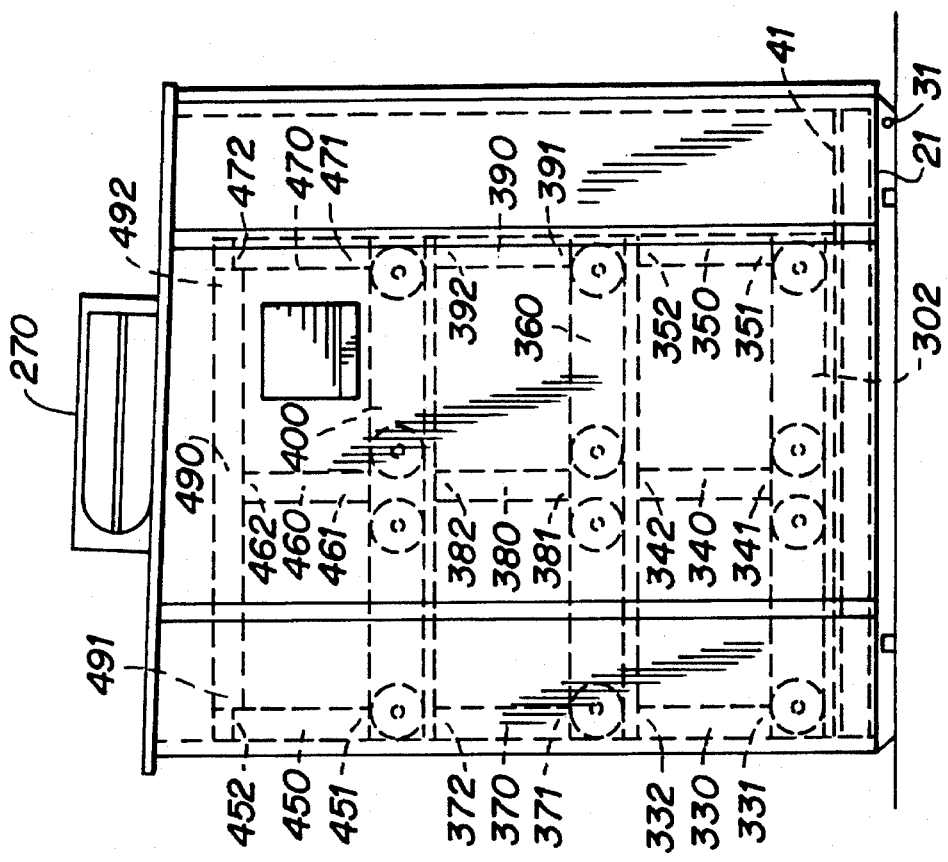
FIG. 6 is a right side elevation view of the first form of the present invention.

As depicted in, for example, FIGS. 2 and 6, the energy storage system of the present invention includes various heating and cooling systems of conventional design. Such systems maintain the temperature of the housing at an appropriate level to ensure proper functioning of the electric energy storing devices contained within the housing. As should be understood, the appropriate temperatures at which the housing should be kept depend on the type of electric energy storing device employed in the system. Heating and air conditioning units 270 may be mounted on the roof 250. Optionally, such heating and air conditioning units may be mounted inside the energy storage system. The heating and air conditioning units may be heat pumps or other devices coupled in heat exchange relation to the housing. In addition, vapor scrubbers (not shown) may be mounted on the roof or walls of the energy storage system in order to provide ventilation of the housing and prevent noxious vapors from escaping to the atmosphere. Further, chemical agents could be placed within the housing in order to neutralize leaks from energy storing devices stored in the system. Such chemical agents could include Dryrite™ crystals and sodium carbonate.

The interior 20 of the housing 15 contains one or more of racks 300. In some circumstances one large rack may be preferable to many smaller racks. For purposes of brevity, the construction of only a single rack is described herein.

The racks 300 are adapted to hold a plurality of energy storing devices. In the first form of the present invention, each of the racks 300 is a three-tier rack and ten racks are placed in side-by-side adjacent position within the housing 20. A variety of single-tier or multi-tier racks could be used in the energy storage system. Each rack has a first tier and includes a first, I-shaped support 302 which has a first surface 303, a second surface 304, a top surface 305, and a bottom surface 306. Each rack also includes a second, I-shaped support 310 which has a first surface 313, a second surface 314, a top surface 315, and a bottom surface 316. The bottom surfaces 306 and 316 of each support 302 and 310 are mounted on the second floor 41. Each support extends substantially from the front side 44 to the rear side 45 of the floor 41. The supports 302 and 310 are spaced apart in substantially parallel relation one to the other.

Figure 4:
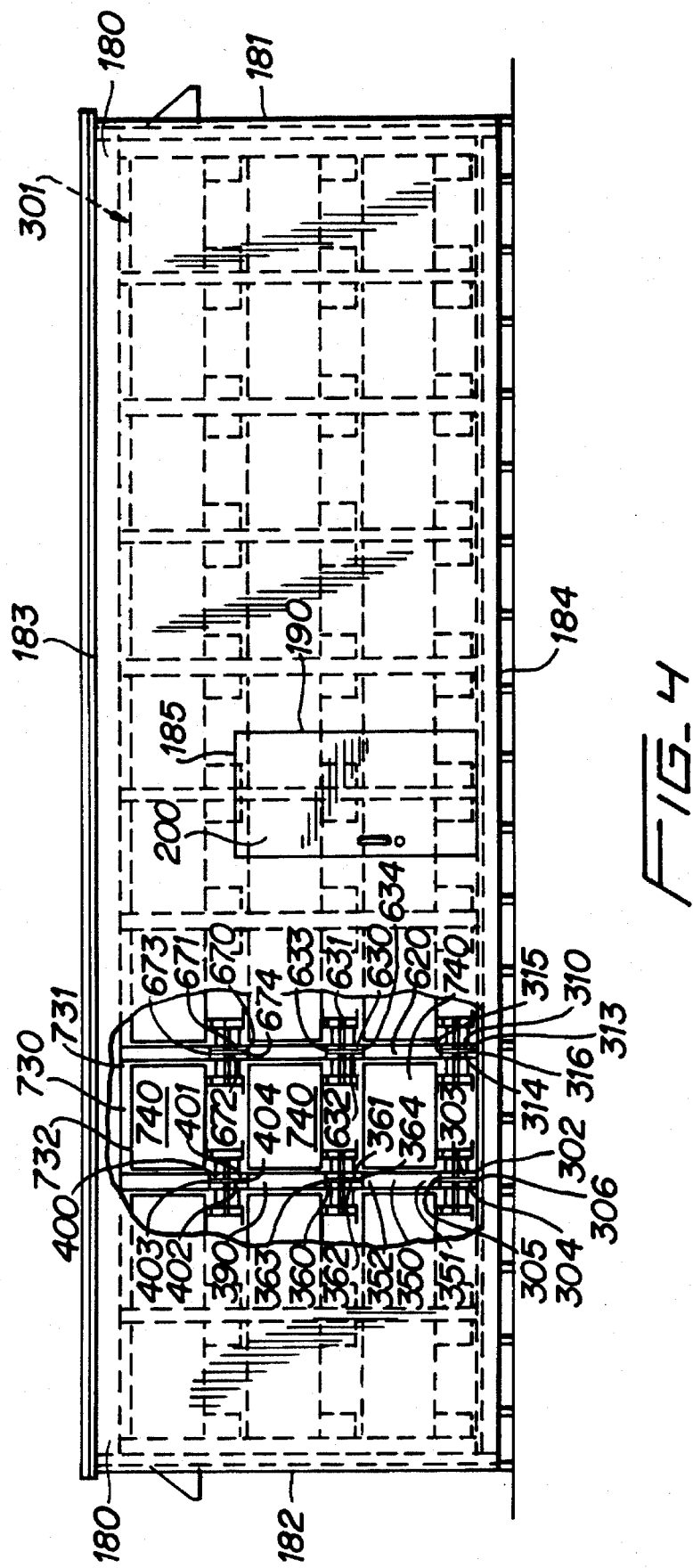
FIG. 4 is a rear elevation view of the first form of the present invention.

As can best be seen by reference to FIGS. 4 and 6, mounted on the top surface 305 of the support 302 is a first vertical support 330 having a first end 331 and a second end 332; a second vertical support 340 having a first end 341 and a second end 342; and a third vertical support 350 having a first end 351 and a second end 352. Mounted on the second ends 332, 342, and 352 of the vertical supports 330, 340, and 350 is a third, I-shaped support 360 which has a first surface 361, a second surface 362, a top surface 363, and a bottom surface 364. The third, I-shaped support extends substantially the length of the second floor 41, from the front side 44 to the rear side 45.

In a fashion similar to that just described, mounted on the top surface 363 of the third, I-shaped support 360 is a fourth vertical support 370 having a first end 371 and a second end 372; a fifth vertical support 380 having a first end 381 and a second end 382; and a sixth vertical support 390 having a first end 391 and a second end 392. Mounted on the second ends 372, 382, and 392 of the vertical supports 370, 380, and 390, and part of the second tier of the rack is a fourth, I-shaped support 400 which has a first surface 401, a second surface 402, a top surface 403, and a bottom surface 404. The fourth, I-shaped support 400 extends substantially the length of the second floor 41, from the front side 44 to the rear side 45.

In order to construct the third tier of each three-tier rack 300, a seventh vertical support 450 having a first end 451 and a second end 452; a eighth vertical support 460 having a first end 461 and a second end 462; and a ninth vertical support 470 having a first end 471 and a second end 472 are mounted on the top surface 403 of the fourth, I-shaped support 400. Mounted on the second end 462 of the vertical support 460 is a first beam 490 having a first end 491 and a second end 492. The first beam 490 extends substantially the length of the second floor 41, from the front side 44 to the rear side 45.

As should be understood, the structure of the racks 300 repeats itself. Accordingly, mounted on the top surface 315 of the second, I-shaped support 310 is a tenth vertical support 600 having a first end 601 and a second end 602; an eleventh vertical support 610 having a first end 611 and a second end 612; and a twelfth vertical support 620 having a first end 621 and a second end 622. Mounted on the second ends 602, 612, and 622 of the vertical supports 600, 610, and 620 is a fifth, I-shaped support 630 which has a first surface 631, a second surface 632, a top surface 633, and a bottom surface 634. The fifth, I-shaped support extends substantially the length of the second floor 41, from the front side 44 to the rear side Mounted on the top surface 633 of the fifth, I-shaped support 630 is a thirteenth vertical support 640 having a first end 641 and a second end 642; a fourteenth vertical support 650 having a first end 651 and a second end 652; and a fifteenth vertical support 660 having a first end 661 and a second end 662. Mounted on the second end 652 of the vertical support 650 is a sixth, I-shaped support 670 which has a first surface 671, a second surface 672, a top surface 673, and a bottom surface 674. The sixth, I-shaped support 670 extends substantially the length of the second floor 41, from the front side 44 to the rear side 45.

Lastly, a sixteenth vertical support 680 having a first end 681 and a second end 682; a seventeenth vertical support 690 having a first end 691 and a second end 692; and a eighteenth vertical support 700 having a first end 701 and a second end 702 are mounted on the top surface 673 of the sixth, I-shaped support 670. Mounted on the second end 692 of the vertical support 690 is a second beam 710 having a first end 711 and a second end 712. The second beam 710 extends substantially the length of the second floor 41, from the front side 44 to the rear side 45. Mounted on the first end 491 of the first beam 490 and the first end 711 of the second beam 710 is a first cross-piece 720 having a first end 721 and a second end 722. Mounted on the second end 492 of the first beam 490 and the second end 712 of the second beam 710 is a second cross piece 730 having a first end 731 and a second end 732.

As should be apparent from the discussion above, the racks 300 positioned within the housing 15 are, in general, space-frame type racks and they may be of various constructions different from that just described. The racks may be made from angle iron, steel or other metal tubing, plastic, fiberglass and other suitable materials. Such materials may be welded, bolted, or otherwise affixed to one another by methods known in the art. It should be understood that various types of frames may be used in order to obtain a storage system within the teachings of the present invention.

As can be seen more clearly in FIGS. 4 and 7, the housing 15 is adapted to store a plurality of energy storing devices or battery modules 740. An exemplary battery module 740 is shown in FIG. 9. The battery module 740 includes a tray 751 having a bottom surface 752. In addition, the battery module 740 includes two batteries 755 and two reservoir units 756 which contain an electrolyte. The exemplary battery module 740 employs zinc-bromine batteries, but it is to be understood that various types of electrochemical energy storage devices, such as lead-acid, vanadium redox, various metal-halogen batteries, and even capacitors could be used as energy storing devices for use with the energy storage system of the present invention. The battery module 740 has an energy storage capacity of about 33 kWh. Each of the three tier racks 300 may hold three battery modules. Accordingly, thirty battery modules may be stored in the form shown in FIG. 2 and the total storage capacity of the system is about 990 kWh.

Each of the modules is supported by a two runners, which are discussed below. A single battery module is mounted upon two runners each of which is rollingly mounted on one single three-tier rack 300 in a manner similar to the mounting of a drawer within a cabinet. The two runners act as a shelf by which each battery module may be slid into and out of each rack 300.

Figure 5:
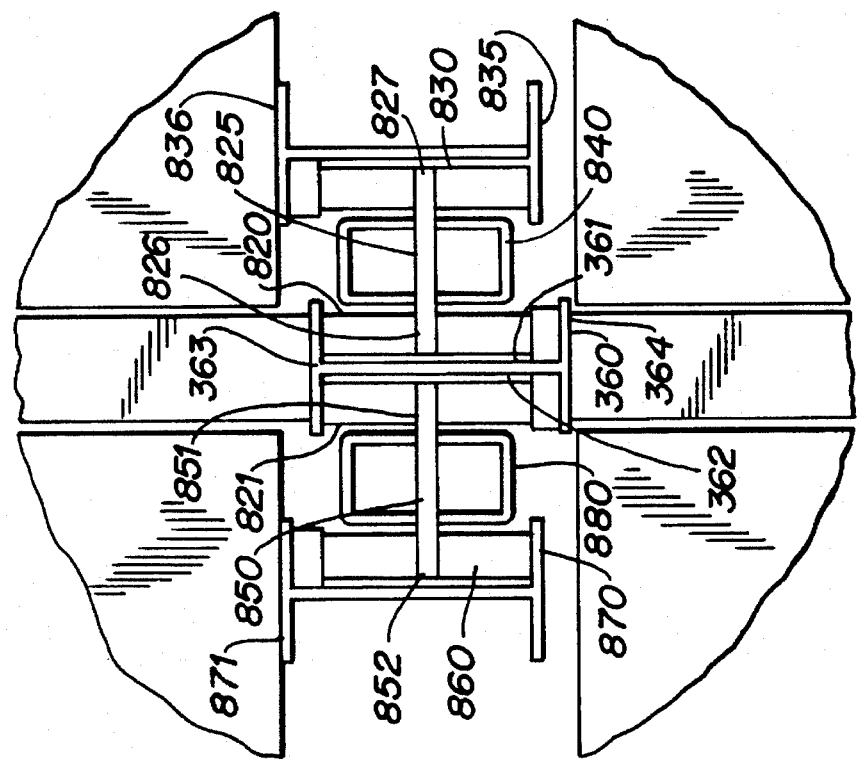
FIG. 5 is an enlarged, fragmentary view of a portion of the first form of the present invention.

As can best be seen by reference to FIGS. 2, 4, and 5 through 8, each of the I-shaped supports is adapted to receive a plurality of wheels. For purposes of brevity, one, exemplary I-shaped support, I-shaped support 360, will be discussed in detail. The I-shaped support 360 is shown in FIG. 5 having the surfaces 361, 362, 363, and 364. Both surfaces 361 and 362 of the I-shaped support 360 are adapted to receive a set of four wheels, a first set of wheels 820 and a second set of wheels 821, respectively. The I-shaped support 360 acts as a race within which the sets of wheels rotate. In the center of each wheel of the first set of wheels 820 is a hole (not shown) which is adapted to receive one of a first plurality of axles 825. Each of the axles 825 has a first end 826 which is in close proximity to the first surface 361 and a distal or second end 827. Mounted on the second ends 827 of the axles 825 is a third set of four wheels 830, one wheel per end. The third set of wheels 830 is received by a runner 835 which is structurally similar to the I-shaped supports already discussed and has a top surface 836. Located between the first set of wheels 820 and the third set of wheels 830 is a beam 840 having a first end 841, a second end 842, and a plurality of holes 843. Each one of the holes 843 is adapted to receive one of the plurality of axles 825.

As with the first set of wheels 820, in the center of each wheel of the second set of wheels 821, is a hole (not shown) which is adapted to receive one of a second plurality of axles 850. Each of the axles 850 has a first end 851 which is in close proximity to the second surface 362 of the I-shaped support 360 and a distal or second end 852. Mounted on the second ends 852 of the axles 850 is a fourth set of four wheels 860, one wheel per end. The fourth set of wheels 860 is received by a runner 870, which has a top surface 871 and, as noted, is similar to the I-shaped supports already discussed. Located between the second set of wheels 821 and the fourth set of wheels 860 is a beam 880 having a first end (not shown), a second end (not shown), and a plurality of holes (not shown). Each one of the holes 883 is adapted to receive one of the plurality of axles 850.

The structure just described permits each energy storing device or battery module to be moved from a first, or operational position, 890 to a second, or maintenance position, 891 along a path of travel 892, as is shown in FIG. 7. In the first position the energy storing devices are environmentally protected. In the second position, the energy storing devices are readily accessible. As should be understood from the previous discussion, the bottom surface 752 of each battery module tray 751 rests in frictional engagement upon two runners. Each of the runners is rollingly mounted on, or coupled to, each three-tier rack 300 by two sets of wheels. The mounting or coupling is accomplished by one set of wheels received by the runner and another set of wheels received by the I-shaped support. Accordingly, each runner may be set in motion along the path of travel 892 in two ways. First, the runner may be moved by rolling of the wheels received within it causing it to move along the path of travel 892. Second, the runner may be moved by rolling of the wheels received within the I-shaped support. A pair of runners, two beams, four sets of wheels, and two I-shaped supports form an energy-storing-device, or battery-module, access mechanism. As should be understood, a variety of structures other than the one just described may be used in order to permit the movement of each battery module 740 along the path 892. A variety of sliding shelf or drawer mechanisms of conventional design might be used as battery module access mechanisms. For example, sliding shelves could be mounted within grooves formed in the I-shaped supports. The shelves could be supported by a plurality of rolling or ball bearings in order to facilitate movement of the shelves within the grooves.

When the energy storage system 10 is in use, each of the battery modules 740 is in the first or operational position 890. Typically, in the first position 890 each battery module is electrically coupled to a collector bus or collector bar (discussed further hereinafter) which collects the current of each of the battery modules in a fashion appropriate for the energy storage application at hand. The collector bus may be coupled to power conversion or conditioning equipment of conventional design, which in the first form of the present invention is housed in a structure separate from the energy storing devices.

Over time each battery module may require maintenance and, accordingly, must be moved to the second position 891 or another position along the path 892 so that maintenance may be performed or battery replacement carried out.

Second Form

In a second form of the present invention the maintenance and replacement of the batteries in the energy storage system is facilitated by an energy-storing-device, or battery module carrier which will be discussed in greater detail hereinafter.

A storage system manufactured according to the second form of the present invention is designated generally by the numeral 1000 in FIG. 10. The energy storage system 1000 has most of the features of the energy storage system 10 discussed above. The energy storage system 1000 includes a housing 1005 and a front wall 1006. The housing 1005 is larger than the housing 15 and includes a bay 1007. Preferably, the housing 1005 is approximately 43 feet long and approximately 11 feet wide. The bay 1007 includes an opening 1008 in which is mounted a double door 1009. The double door 1009 is sealed in the same fashion as the double doors described previously. The bay is shown positioned at one end of the housing, but may be located anywhere within it.

Figure 16:
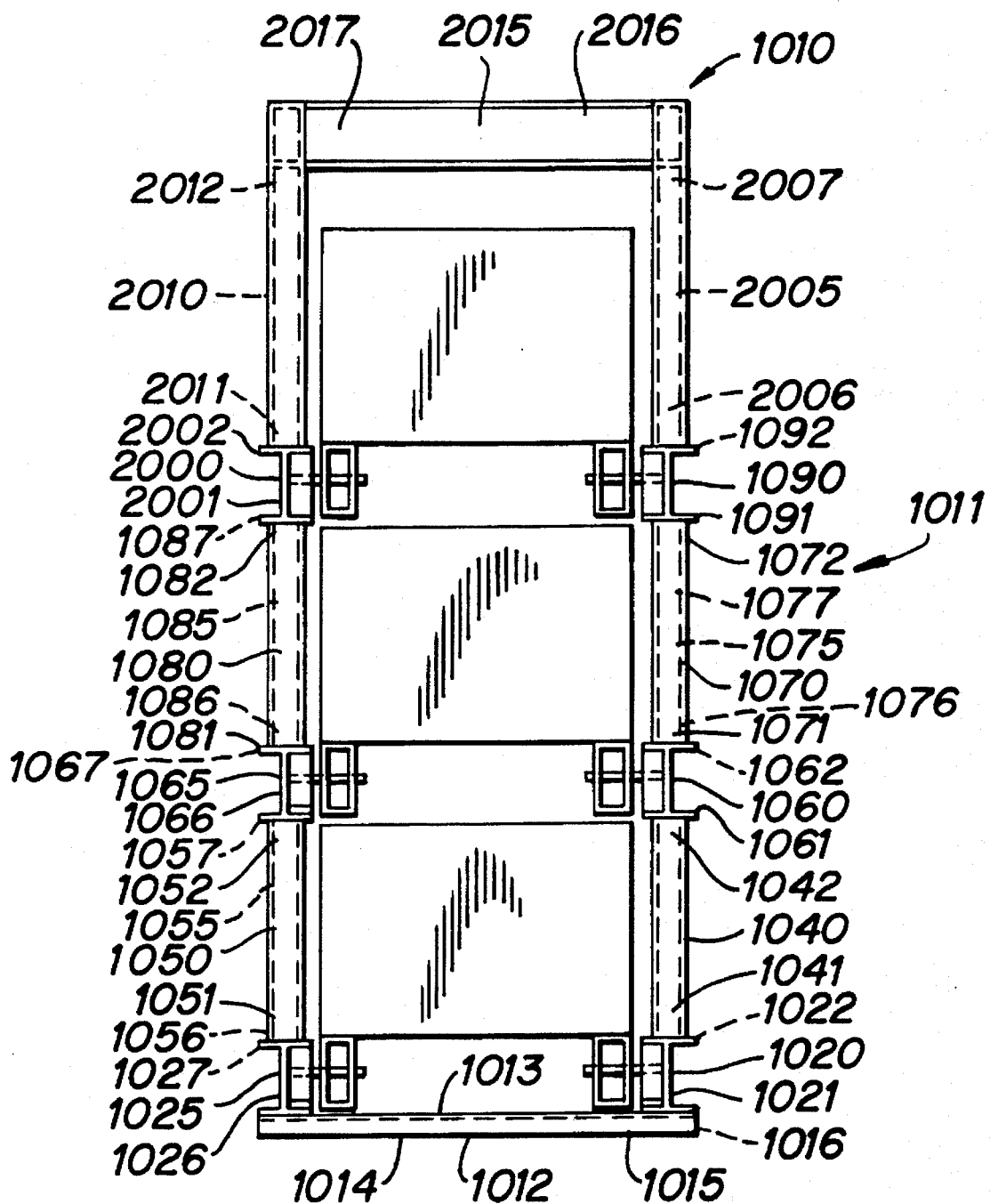
FIG. 16 is a fragmentary, longitudinal, vertical sectional view of the second form of the present invention taken along the line 16—16 of FIG. 14.
Figure 20A:
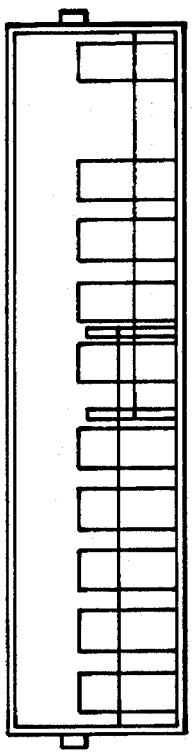
FIG. 20 is a schematic diagram showing the movement of the racks for access within the third form of the present invention.
Figure 20C:
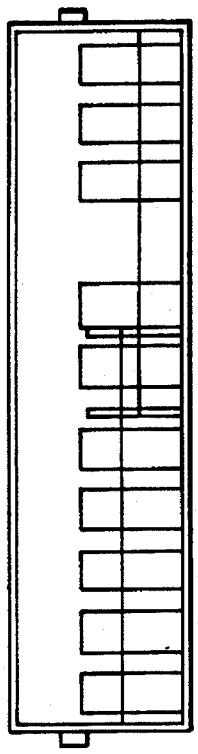
Figure 20:
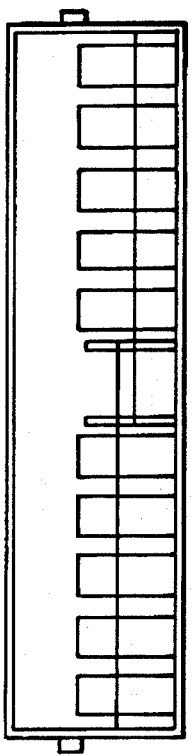
Figure 20B:
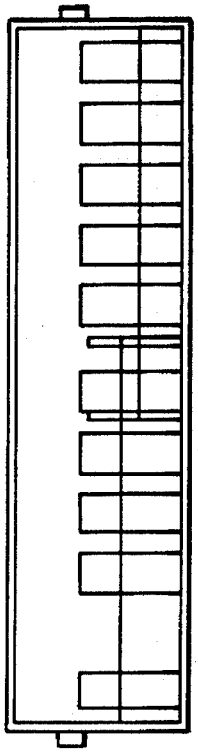
Figure 20D:
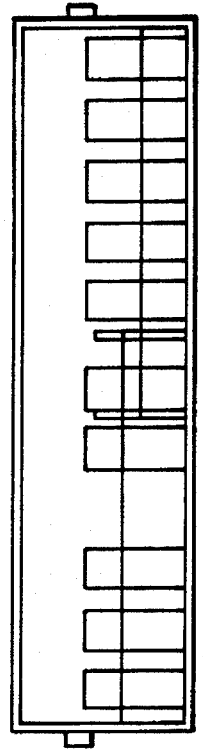
Figure 22:
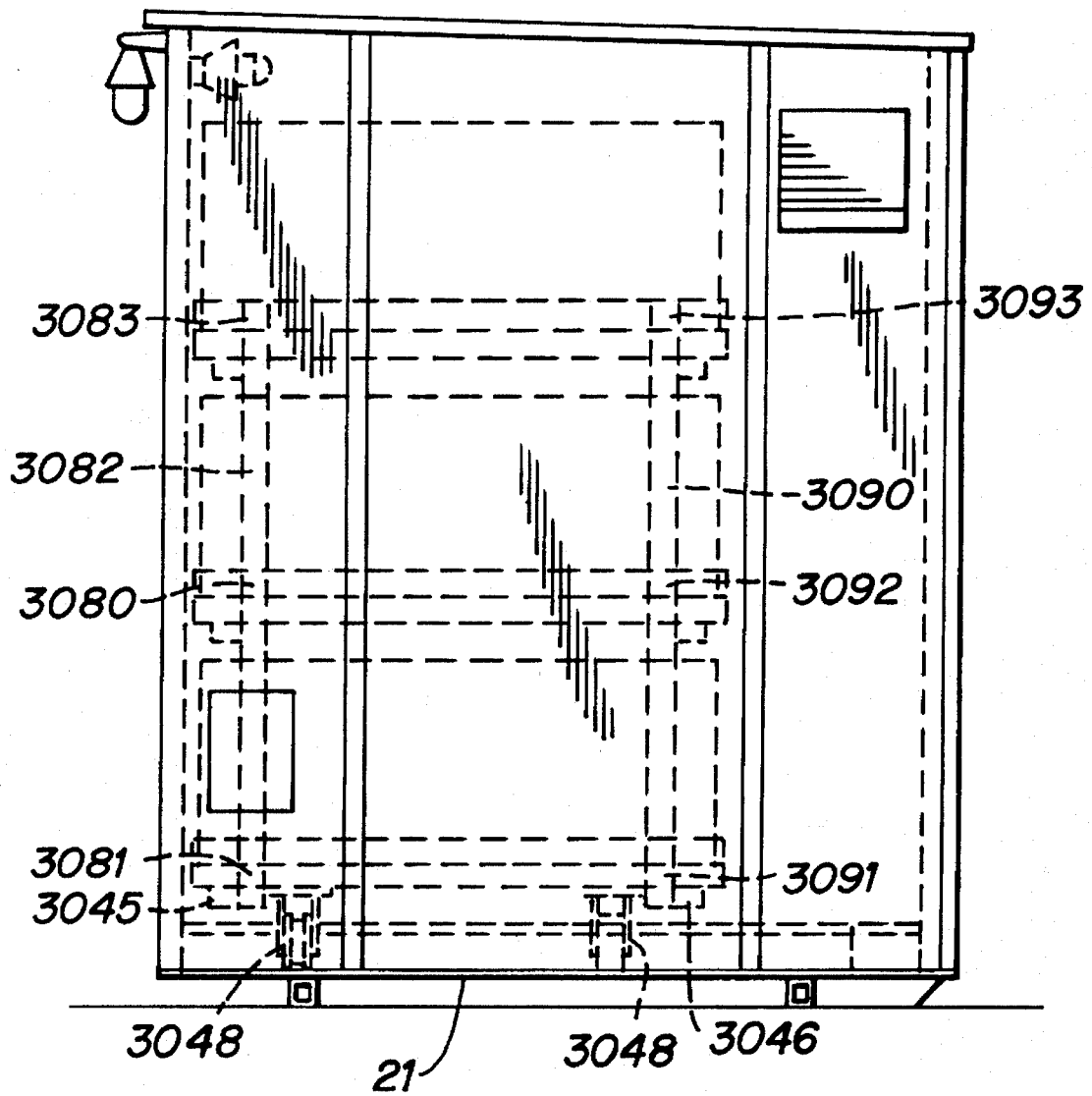
FIG. 22 is a right side elevation view of the third form of the present invention.
Figure 23:
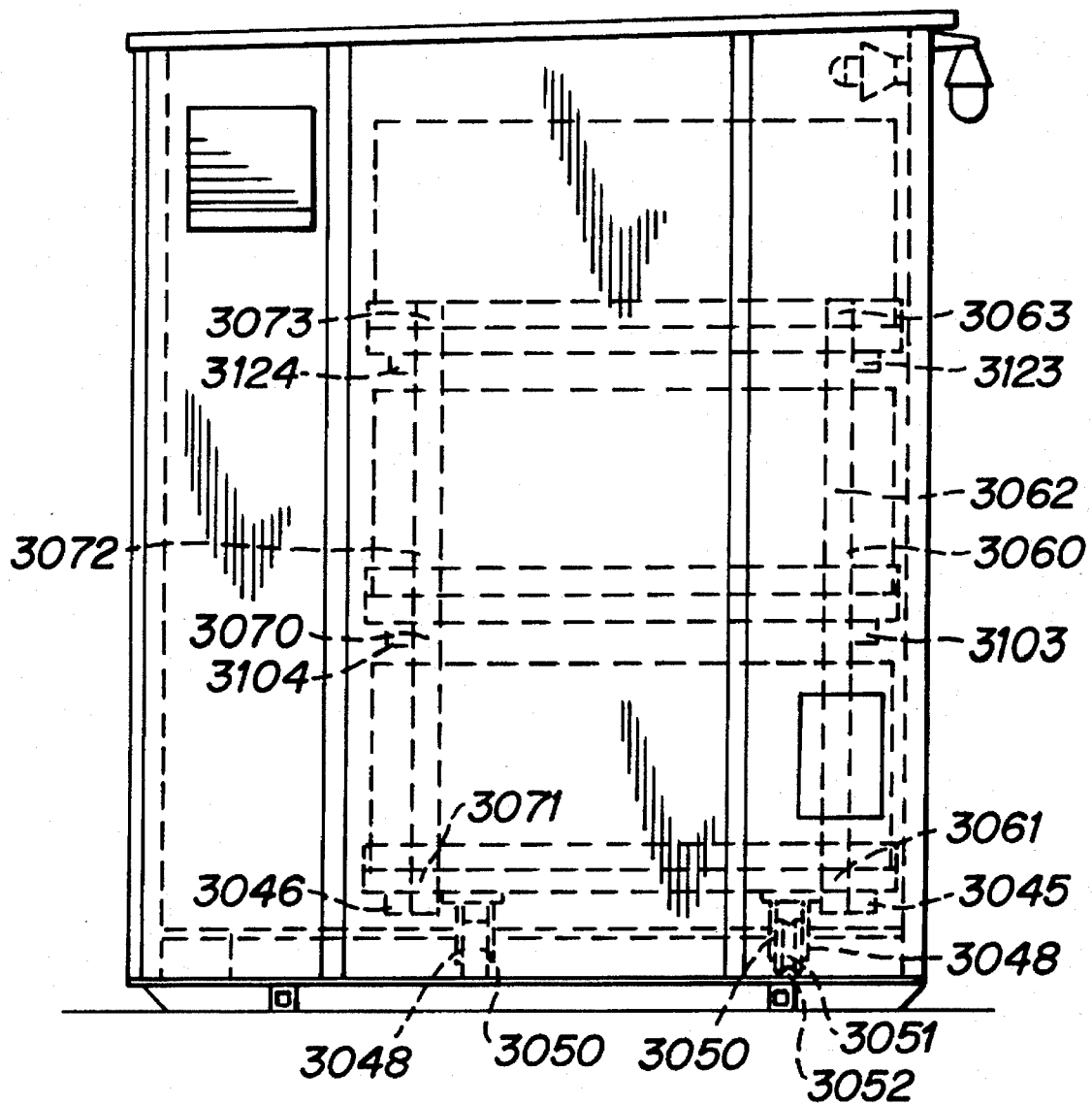
FIG. 23 is a left side elevation view of the third form of the present invention.
Figure 28:
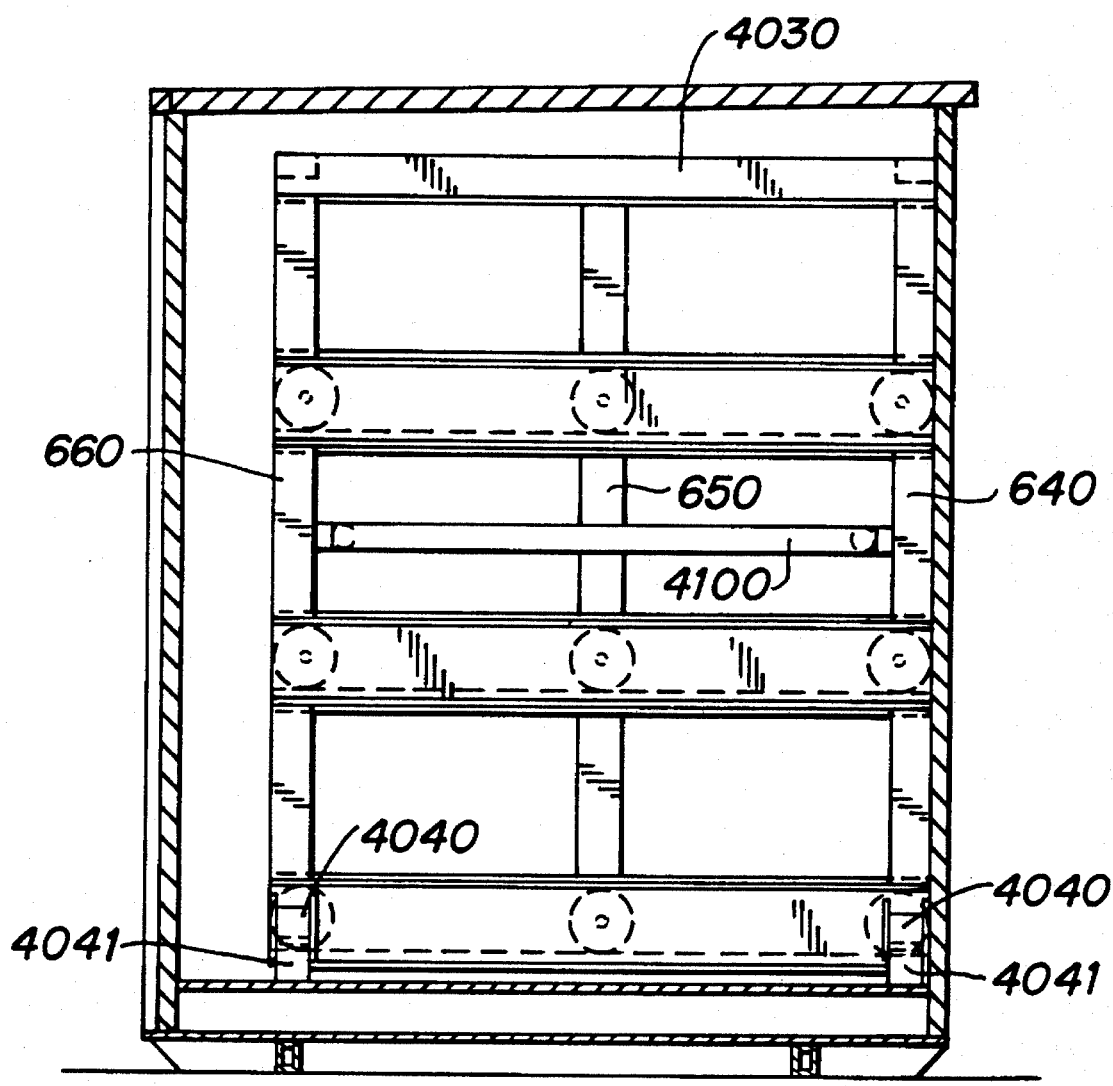
FIG. 28 is a cross-sectional view of the fourth form of the present invention taken along the line 28—28 of FIG. 25.

Within the bay 1007 is stored an energy storing device, or battery-module, carrier 1010. As best seen by reference to FIGS. 14 and 16, the battery-module carrier 1010 includes a frame 1011. The frame 1011 includes a base 1012 having a top 1013, a bottom 1014, a front 1015, and a rear 1016. Mounted on the base 1012 is a first I-shaped support 1020 having first and second ends 1021 and 1022. Also mounted on the base 1012 is a second I-shaped support 1025 having first and second ends 1026 and 1027. Mounted on the second end 1022 of the first I-shaped support 1020 is a first wheel 1028. The first wheel 1028 has an exterior surface 1029. The exterior surface 1029 has a groove 1030 formed therein. Mounted on the second end 1027 of the second I-shaped support 1025 is a second wheel 1035. The second wheel 1035 has an exterior surface 1036 which includes a groove 1037 formed therein. A first vertical support 1040 having a first end 1041 and a second end 1042 is mounted on the first end 1021 of the first I-shaped support 1020. A second vertical support 1045 having a first end 1046 and a second end 1047 is mounted on the second end of the first I-shaped support 1020.

Similarly, a third vertical support 1050 having first and second ends 1051 and 1052 is mounted on the first end 1026 of the second I-shaped support 1025. A fourth vertical support 1055 having a first end 1056 and a second end 1057 is mounted on the second end of the second I-shaped support 1020.

Mounted on the second ends 1042 and 1047 of the first and second vertical supports 1040 and 1045 is a third I-shaped support 1060 having first and second ends 1061 and 1062. Mounted on the second ends 1052 and 1057 of the third and fourth vertical supports 1050 and 1055, respectively, is a fourth I-shaped support 1065 having first and second ends 1066 and 1067.

A fifth vertical support 1070 having first and second ends 1071 and 1072 is mounted on the first end 1061 of the third I-shaped support 1060. A sixth vertical support 1075 having first and second ends 1076 and 1077 is mounted on the second end 1062 of the third I-shaped support 1060. A seventh vertical support 1080 having first and second ends 1081 and 1082 is mounted on the first end 1066 of the fourth I-shaped support 1065. An eighth vertical support 1085 having first and second ends 1086 and 1087 is mounted on second end 1067 of the fourth I-shaped support 1065.

Mounted on the second ends 1072 and 1077 of the fifth and sixth vertical supports 1070 and 1075 is a fifth I-shaped support 1090 having first and second ends 1091 and 1092. Mounted on the second ends 1082 and 1087 of the seventh and eighth vertical supports 1080 and 1085 is a sixth I-shaped support 2000 having first and second ends 2001 and 2002.

Mounted on the second end 1092 of the fifth I-shaped support 1090 is a ninth vertical support 2005 having first and second ends 2006 and 2007. Mounted on the second end 2002 of the sixth I-shaped support 2000 is a tenth vertical support 2010 having first and second ends 2011 and 2012. Mounted between the second end 2007 of the ninth vertical support 2005 and the second end 2012 of the tenth vertical support 2010 is a cross piece 2015 having a first end 2016 and a second end 2017. Mounted on the cross piece 2015 is a T-shaped slide 2018. The T-shaped slide fits in a channel discussed further hereinafter. It should be understood that one or more wheels or other devices capable of sliding or rolling in a slot may be mounted on the cross piece 2015 to take the place of the T-shaped slide 2018.

In order to brace the battery module carrier 1020, a number of braces may be mounted between the I-shaped or other supports. A first brace 2020 is mounted between the first end 1091 of the fifth I-shaped support 1090 and the second end 2007 of the ninth vertical post 2005. Similarly, a second brace 2025 is mounted between the first end 1091 of the fifth I-shaped support 1090 and the second end 1022 of the first I-shaped support 1020.

A third brace (not shown) is mounted between the first end 2001 of the sixth I-shaped support 2000 and the second end 2012 of the tenth vertical support 2010. A fourth brace (not shown) is mounted between the first end 2001 of the sixth I-shaped support 2000 and the second end 1027 of the second I-shaped support 1025.

As best seen by reference to FIGS. 10, 14, 15, and 15A, the battery-module carrier 1010 is designed to move along the face of the front wall 1006 of the housing 1005 in a path of travel 2050, from a first position 2051 to a second position 2052. The battery-module carrier 1010 may be moved manually or otherwise from the bay 1007 and mounted on two guides upon which the battery-module carrier 1020 may be moved. Mounted on the front wall 1006 is a first guide 2060 having a first end 2061 and a second end 2062. In one form, the guide 2060 may be a square or rectangular metal tube having a corner 2063. The grooves 1030 and 1037 of the wheels 1028 and 1035 are matingly fitted on the corner 2063 and the wheels ride on or roll along the corner 2063. Also mounted on the front wall 1006 is a second guide 2070 having a first end 2071 and a second end 2072. The second guide 2070 may also be a square or rectangular tube. The first end 2071 includes a slot and channel integral with the slot which runs substantially the length of the guide 2070. The T-shaped slide 2018 fits through the slot and may be slid into the channel which holds the T-shaped slide 2018. The T-shaped slide is slidably moveable along the channel.

When mounted on the guides 2060 and 2070 the battery module carrier may be moved manually, or otherwise, to desired positions in front of the openings 85. Once in position, battery modules may be slid onto the battery module carrier for maintenance or removal from the energy storage system. In addition, batteries may also be installed from the carrier into the energy storage system.

The housing 1005 includes a rear wall 2100 which is shown in FIG. 12. The rear wall 2100 is nearly the same as the rear wall 180 except for being longer. The rear wall includes an opening 2105 having a peripheral edge 2110. Mounted in the opening is a door 2115.

As should be understood, the energy storage system 1000 contains a plurality of racks 300 which are the same as those discussed above for the energy storage system 10.

Third Form

In a third form of the present invention maintenance and replacement of the energy storing devices or battery modules in the energy storage system is facilitated by an advancing mechanism, where each rack may be moved within the housing so as to provide access to each rack of battery modules.

An energy storage system manufactured in accordance with the teachings of the third form of the present invention is designated by the numeral 3000 in FIG. 18, and includes most of the features of the energy storage system 10, including the first floor 21, the first side wall 60, and the second side wall 70. The energy storage system 3000 includes a housing 3001 and an interior 3002. The housing 3001 is larger than the housing 10. Preferably, the housing is about 42 feet long and 9 and one half feet wide. The housing includes a rear wall 3005 which is shown in FIG. 21. As should be understood, the first floor 21 is larger in the third form than in the first form. In addition, the rear wall 3005 is longer than the rear wall 180.

Positioned between the first side wall 60 and the second side wall 70 is a front wall 3010. The front wall 3010 has a first end 3011, a second end 3012, a top edge 3013, and a bottom edge 3014. The front wall 3010 has a plurality of openings 3015, of a first size, and another opening 3016. In the preferred form, the front wall 3010 has four openings 3015.

Each of the openings 3015 has a peripheral edge 3017 around which may be mounted sealing material (not shown) to provide an air tight seal around each of the peripheral edges of the openings. Similarly, the opening 3016 has a peripheral edge 3018 around which may be mounted the same sealing material. Mounted within the openings 3015 is a plurality of double access doors 3020. A single access door 3025 is mounted within the opening 3016. The access doors 3020 and 3025 may be opened in order to permit access to the interior 3002 of the housing 3001.

The interior 20 of the housing 15 includes a plurality of racks 3030. As can be best seen by reference to FIG. 18 through 23, each of the racks 3030 is a three-tier rack and includes a bottom portion having a first shelf 3040. The first shelf includes a first bracket 3041 having a bottom surface 3042; a second bracket 3043 having a bottom surface 3044; a third bracket 3045; and a fourth bracket 3046. Mounted on the bottom surfaces 3042 and 3044 is plurality of wheels 3048. The wheels 3048 have an exterior surface 3050 in which a groove 3051 may be formed. The groove 3051 may be adapted to matingly fit with a track 3052. The track 3052 is mounted or formed on the first floor 21. As should be understood the wheels 3048 are mounted on the bottom portion of each rack 3030, rest on the floor 21, and are adapted to roll thereon.

While inverted v-shaped members have been shown for purposes of illustration, it will be understood that various other configurations can be used for tracks For example, C-shaped members or solid rails on which railroad car type wheels could be mounted can be used for tracks.

Mounted on the first shelf 3040 of each rack 3030 is a first post 3060, having a first end 3061, a middle portion 3062, and second end 3063; a second post 3070 having a first end 3071, a middle portion 3072, and a second end 3073; a third post 3080 having a first end 3081, a middle portion 3082, and a second end 3083; and a fourth post 3090 having a first end 3091, a middle portion 3092, and a second end 3093.

Mounted on the middle portions 3062, 3072, 3082, and 3092 of the first, second, third, and fourth posts 3060, 3070, 3080, and 3090 is a second shelf 3100. The second shelf 3100 includes a first bracket 3101, a second bracket 3102, a third bracket 3103, and a fourth bracket 3104.

Mounted on the second ends 3063, 3073, 3083, and 3093 of the first, second, third, and fourth posts 3060, 3070, 3080, and 3090, is a third shelf 3120. The third shelf includes a first bracket 3121, a second bracket 3122, a third bracket 3123, and a fourth bracket 3124.

Each of the shelves in the racks 3030 is adapted to receive a battery module. As can be seen by reference to FIG. 23, each battery module may be positioned by a lift truck (not shown) and placed on, or removed from, any one of the racks 3030 through the openings 3015.

The racks 3030 may be moved within the housing 20 by manual or mechanical means, of conventional design, along a path 3130. As best seen by reference to FIG. 20, ten racks may be placed within the housing and access to the battery modules in the racks may be gained by appropriately moving some of the racks along the path 3130 in order to gain access to the desired rack. Maintenance personnel may then enter the housing 20 through one of the openings 3015 or the opening 3016 by opening the appropriate access door. Once inside the housing, maintenance personnel may perform required tasks.

Figure 29:
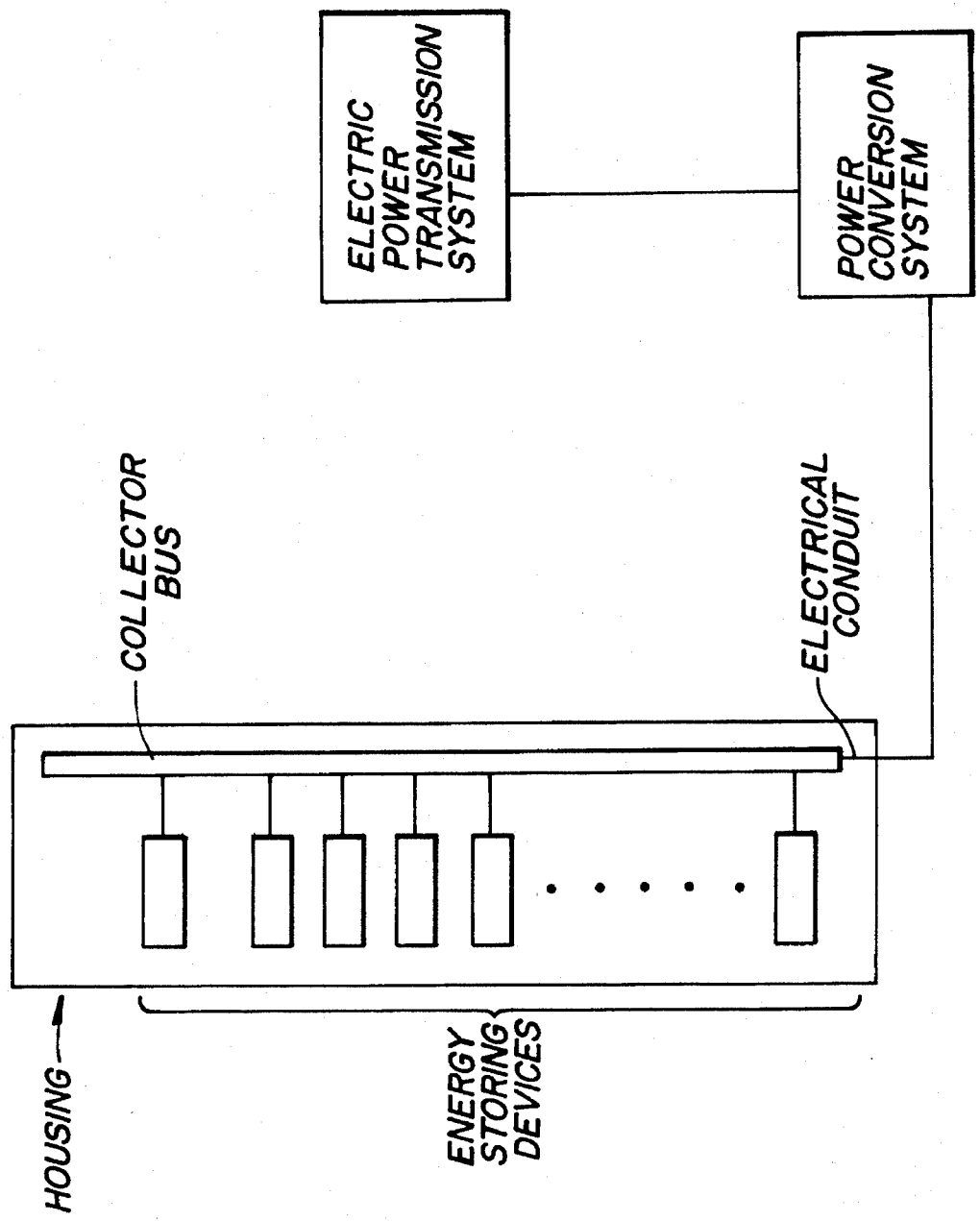
FIG. 29 is a schematic circuit diagram illustrating the electrical couple between the energy storage device of the present invention and an electric power transmission system.

Another of the features of the energy storage system of the third form of the present invention is one or more collector busses 3150 and is best seen in FIGS. 19 and 24. In the preferred form, one collector bus is positioned so that a plurality of cables 3160, one from each battery module, may be slidingly mounted thereon and electrically coupled thereto. The cables are mounted on the collector bus in such a manner as to provide a good electrical couple between each of the battery modules and the collector bus. As should be understood collector busses may be used with any of the forms of the present invention. The collector busses provide a convenient means for electrically coupling the energy storage system to an electric power transmission system. The collector buses may be coupled to electric conduits. The electrical conduits may be coupled to power conversion or conditioning equipment located within the housing. In the alternative, the conduits may exit the housing, through openings discussed previously, and be coupled to power conversion equipment located outside the housing. As should be understood, the power conversion equipment may coupled to an electric power transmission system. One way of coupling the energy storage system to an electric power transmission system is shown in FIG. 29.

Fourth Form

As should be understood, the concepts described above may be combined into a single energy storage system. In a fourth form of the present invention the concepts of the first and third forms are combined.

The energy storage system of the fourth form is designated by the numeral 4000 in FIG. 25 and includes a housing 4001 an interior 4002, a first floor 4003, a second floor 4004, a first side wall 4005, and a second side wall 4006.

Positioned between the first side wall 4003 and the second side wall 4004 is a front wall 4010. The front wall 4010 has a first end 4011, a second end 4012, a top edge 4013, and a bottom edge 4014. The front wall 4010 has a plurality of openings 4015. In the preferred form, the front wall 4010 has three openings each of which has a peripheral edge 4016. Mounted within the opening 4015 are a plurality of double access doors 4020. The access doors 4020 may be opened in order to provide access to the interior 4002 of the housing 4001.

The interior 4002 of the housing 4001 includes a plurality of racks 4030, which are nearly identical to the racks 300 described above.

Mounted on the first and second I-shaped support 302 and 310 are a plurality of wheels 4040. The wheels 4040 have a surface 4041 in which a groove (not shown) is formed. The groove is adapted to matingly interfit with one or more tracks which may be mounted or formed on the floor 4004. The wheels may then be mounted on one or more tracks and ride thereon. Mounted between the fourth, fifth, and sixth vertical supports 370, 380, and 390 (see FIG. 6) is a first bumper 4100. Mounted on the thirteenth, fourteenth, and fifteenth vertical supports 640, 650, and 660 is a second bumper 4200. Each bumper 4100 and 4200 is designed to be forced in frictional contact against the corresponding bumpers of each adjacent rack. Similar to the movement of the racks 3030, the racks 4030 may be manually or mechanically positioned within the housing 20 to provide access to the battery modules stored within it.

OPERATION

The operation of the present invention is believed to be readily apparent but is briefly summarized below.

The energy storage systems 10, 1000, 3000, and 4000, are designed to store a plurality of energy storing devices or battery modules on racks positioned within a building or housing. The housing is constructed to ensure that the environment does not become contaminated by the battery modules, and likewise that the battery module do not become damaged by the environment. The housing is a hazardous materials building. The housing has a plurality of openings which are occluded by access doors. The energy storing devices are accessible through the openings of the housing in order to provide access for maintenance, installation, and removal of the energy storing devices or battery modules. The roof and front, rear, and opposed side walls form a weather protective enclosure. The housing also contains a sump to contain any liquids, such as electrolyte, spilled or leaked from the energy storing devices. The housing 20 is transportable, by means, for example, of a tractor-trailer combination. Accordingly the footprint, or area in which the housing fits, is preferably less that about 400 square feet.

In order to facilitate access to the battery modules within the housing 20, the battery modules rack or racks are designed to have one or more special features. The rack or racks may have battery access mechanisms or sliding shelves. In addition, the racks may move along a track on the floor of the housing. Further, the racks may be constructed to have sliding shelves and to move along a track on the floor of the housing. In addition, and optionally, a battery module carrier may be stored within the housing. The battery module carrier is adapted to slidingly move along the front wall of the housing and is a moveable platform from which battery modules may be positioned onto racks within the housing or onto which battery modules may be removed from the housing.

In order to facilitate transportation of the energy storage system, it is envisioned that the battery modules will be transported separately from the housing 20. In addition, it is envisioned that the battery modules be shipped dry, that is, without electrolyte. Electrolyte may be transported by means of a tanker truck and be placed into the battery modules once they have been placed in a desired location. In addition, in order to provide increased flexibility and weight reduction benefits, the housing may or may not contain a power conversion or conditioning system that converts the DC voltage generated by the battery modules to AC voltage used in electric power transmission systems.

The housing includes appropriate openings so that one or more electrical conduits may pass from inside the housing to outside the housing. The electrical conduits pass through one or more openings which may be in the front, rear, or side walls of the housing and provide a means for electrically coupling the collector bus or busses, which are electrically coupled to the energy storing devices, to an electric power transmission system. The openings on the housing may be fitted with sealing material so that a weather proof seal is formed around the electrical conduits that pass through the housing.

As should be understood, the DC voltage generated by the energy storing devices must be converted to an AC voltage in order to be transmitted on an AC power transmission system. Accordingly, a power conversion system is normally coupled between the energy storing devices in the housing and the electric power transmission system.

The racks of the present invention may be installed in various configurations. In particular, the racks may be configured, and the housing sized, so that the housing is completely filled with battery modules, thus enabling a high energy density to be achieved. When battery modules containing high energy capacity batteries, such as zinc-bromine batteries, are mounted within the racks even more satisfactory high energy density configurations can be achieved.

Thus, the present invention provides an energy storage system that has a relatively high energy storage capacity. In addition, the present invention provides an energy storage system that protects the environment from the energy storage modules within the system and the system from the environment. Further, the present invention provides an energy storage system that is relatively inexpensive and lightweight and which is readily transportable by conventional means such as tractor-trailer and other trucks. Specifically, the present invention provides, in at least one form, an energy storage system that fits within an area of less than about 400 square feet and has an energy storage capacity of greater than 100 kWh.

While, in general, single energy storage systems would be used for one single application, it should be understood that one or more whole, self-contained energy storage systems could be used in conjunction with one another. Individual energy storage systems could be stacked on one another, placed in side-by-side relation, or other various configurations. These units could be electrically coupled to each other before being coupled to power conversion equipment.

While the invention has been herein shown and described in what is perceived to be the most practical and preferred forms, it should be recognized that departures may be made therefrom within the scope of the invention which is not to be limited to the illustrative details disclosed.

What is claimed is:

1. A energy storage system capable of being electrically coupled to an electric power transmission system, the energy storage system comprising:

a housing having a floor which is capable of resting on a supporting surface, a roof, and front, rear, and opposed side walls forming a weather protective enclosure, at least one of the walls having a plurality of openings formed therein, and a plurality of access doors, one each mounted within a predetermined number of the openings;

at least one rack located within the housing which is accessible through at least one of the openings and is adapted to hold a plurality of energy storing devices; and a means for electrically coupling the energy storage devices to the electric power transmission system;

wherein the energy storage system is operable to protect the energy storing devices from environmental agents.

2. A compact energy storage system as claimed in claim 1, and wherein the at least one rack includes a sliding shelf mechanism having one or more energy storing devices mounted thereon and is moveable along a path of travel from a first, operational position, where the energy storing devices are environmentally protected, to a second, maintenance position where the energy storing devices are readily accessible.

3. A compact energy storage system as claimed in claim 2, and wherein the at least one rack is a multi-tiered rack and includes a sliding-shelf mechanism on each tier.

4. A compact energy storage system as claimed in claim 2, wherein the housing further includes a bay for storing an energy-storing-device carrier, a first guide mounted on a first wall of the housing, and a second guide mounted on the first wall of the housing, and wherein the energy-storing-device carrier may be mounted on the first and second guides and be moved thereon.

5. A compact energy storage system as claimed in claim 1, wherein the at least one rack includes a bottom portion and a plurality of wheels mounted on the bottom portion and which are adapted to roll upon a supporting surface.

6. A compact energy storage system as claimed in claim 5, and wherein the housing further comprises a track mounted on the floor and wherein each of the plurality of wheels has an exterior surface and a predetermined number of the plurality of wheels have a groove in their exterior surface which is adapted to matingly fit on the track.

7. A compact energy storage system as claimed in claim 1, and wherein each of the plurality of energy storing devices is a battery module which includes at least one zinc-bromine battery.

8. A compact energy storage system which is capable of being electrically coupled to an electrical power transmission system, the compact energy storage system comprising:
   a transportable housing having a plurality of openings formed therein, a plurality of access doors, one each mounted within a predetermined number of the openings, and a sump; and
   at least one rack located within the housing which is capable of holding a plurality of energy storing devices; and
   at least one collector bus for collecting electric current from the energy storing devices, the collector bus capable of being electrically coupled to the electric power transmission system;
   wherein the energy storage system is operable to contain leaks of material from the energy storing devices and to protect the energy storing devices from environmental agents.

9. A compact energy storage system as claimed in claim 8, wherein the at least one rack further comprises at least one energy-storing-device access mechanism having at least one runner, and the energy storage system further comprises an energy storing device mounted on the at least one runner, wherein the at least one runner is movable along a path of travel from a first position, where the energy storing device is protected from the environment, to a second position, where the energy storing device is readily accessible.

10. A compact energy storage system as claimed in claim 8, and wherein the energy storing device is a battery module.

11. An energy storage system capable of being electrically coupled to an electric power transmission system, the energy storage system comprising:
   a transportable housing adapted to rest on a supporting surface and including a floor having a top surface and a bottom surface, a plurality of openings formed in the housing each having a peripheral edge, and a plurality of access doors mounted within a predetermined number of the openings;
   at least one rack located within the housing and mounted on the top surface of the floor, and wherein the at least one rack is adapted to hold a plurality of energy storing devices;
   a means for electrically coupling the energy storage devices to the electric power transmission system; and
   a means for maintaining the temperature inside the housing at a predetermined level;
   wherein the energy storage system is operable to protect the energy storing devices from environmental agents.

12. A transportable energy storage system capable of being electrically coupled to an electric power transmission system, the energy storage device comprising:
   a transportable housing capable of resting on a supporting surface, and having a roof, front, rear, and opposed side walls forming a weather protective enclosure, at least one of the walls having a plurality of opening formed therein, and a plurality of access doors, one each mounted within a predetermined number of the openings; and a sump which is resistant to corrosive materials;
   at least one rack located within the housing which is accessible through at least one of the openings and is capable of holding at least one energy storing device;
   a means for electrically coupling the energy storage device to the electric power transmission system;
   wherein the energy storage system is operable to contain leaks from the energy storing devices and to protect the energy storing devices from environmental agents.

13. A transportable energy storage system as claimed in claim 12, and wherein the energy storing device fits within an area of about 400 square feet.

14. A transportable energy storage system as claimed in claim 13, and wherein the walls of the housing have an interior surface which is covered with a protective coating.

15. A transportable energy storage system as claimed in claim 13, and wherein the at least one rack includes a sliding shelf mechanism having one or more energy storing devices mounted thereon and is moveable along a path of travel from a first, operational position, where the energy storing devices are environmentally protected, to a second, maintenance position where the energy storing devices are readily accessible.

16. A transportable energy storage system as claimed in claim 15, and wherein the at least one rack is a multi-tiered rack and includes a sliding-shelf mechanism on each tier.

17. A transportable energy storage system as claimed in claim 13, wherein the housing further includes a bay for storing an energy-storing-device carrier, a first guide mounted on a first wall of the housing, and a second guide mounted on a second wall of the housing, and wherein the energy-storing-device carrier may be mounted on the first and second guides and be moved thereon.

18. A transportable energy storage system as claimed in claim 13, wherein the at least one rack includes a bottom portion and a plurality of wheels mounted on the bottom portion and which are adapted to roll upon a supporting surface.

19. A transportable energy storage system as claimed in claim 18, and wherein the housing further comprises a track mounted on the floor and wherein each of the plurality of wheels has an exterior surface and a predetermined number of the plurality of wheels have a groove in their exterior surface which is capable of matingly fitting on the track.

20. A transportable energy storage system as claimed in claim 12, and wherein the system further comprises at least one heating and air conditioning unit coupled in heat exchange relation to the housing.

* * * * *